United States Patent
Kostic

(10) Patent No.: US 7,564,910 B2
(45) Date of Patent: Jul. 21, 2009

(54) METHOD AND SYSTEM FOR COMMUNICATIONS WITH REDUCED COMPLEXITY RECEIVERS

(75) Inventor: Zoran Kostic, 8 Sunrise Cir., Holmdel, NJ (US) 07733

(73) Assignee: Zoran Kostic, Holmdel, NJ (US)

(*) Notice: Subject to any disclaimer, the term of this patent is extended or adjusted under 35 U.S.C. 154(b) by 449 days.

(21) Appl. No.: 11/279,899

(22) Filed: Apr. 17, 2006

(65) Prior Publication Data

US 2007/0243839 A1     Oct. 18, 2007

(51) Int. Cl.
  *H04K 1/10* (2006.01)
(52) U.S. Cl. .................. 375/260; 375/299; 375/347; 375/349
(58) Field of Classification Search .......... 375/260, 375/347, 349, 299; 370/389
See application file for complete search history.

(56) References Cited

U.S. PATENT DOCUMENTS

| | | | |
|---|---|---|---|
| 6,553,019 | B1 | 4/2003 | Laroia |
| 6,625,138 | B2* | 9/2003 | Karna et al. ............ 370/342 |
| 6,819,930 | B1 | 11/2004 | Laroia |
| 7,003,021 | B2 | 2/2006 | Gillhousen |
| 7,006,810 | B1 | 2/2006 | Winters |
| 7,020,110 | B2 | 3/2006 | Walton |
| 2004/0001429 | A1* | 1/2004 | Ma et al. ............ 370/210 |
| 2004/0234012 | A1* | 11/2004 | Rooyen ............ 375/347 |
| 2005/0053164 | A1 | 3/2005 | Catreux |
| 2005/0063378 | A1* | 3/2005 | Kadous ............ 370/389 |
| 2005/0105632 | A1 | 5/2005 | Catreux-Erceg |
| 2005/0175115 | A1 | 8/2005 | Walton |
| 2006/0029146 | A1 | 2/2006 | Catreux |
| 2006/0029149 | A1 | 2/2006 | Kim |
| 2006/0072607 | A1 | 4/2006 | Kent |

OTHER PUBLICATIONS

[Adachi78] Adachi et al, "A Periodic Switching Diversity Technique for a Digital FM Land Mobile Radio," IEEE Transaction on Vehicular Technology, Nov. 1978, pp. 211-219.

[Ak99] D. M. Akos, M. Stockmaster, J. B. Y. Tsui, and J. Caschera, "Direct bandpass sampling of multiple distinct RF signals," IEEE Trans. Commun., vol. 47, No. 7, pp. 983-988, Jul. 1999.

(Continued)

*Primary Examiner*—Emmanuel Bayard

(57) ABSTRACT

The invention provides a new method and system for low complexity, low cost, small component size, and low power communications. The system provides a digital sub-sampling receiver for multiple-antenna wireless receivers, with reduced number of analog RF/IF chains (or one chain) after a fixed number of receive antennas. The system provides a generator of transmit signals/sequences which are preconditioned by the operation of the system to compensate for spectral effects of ultra-low-rate sub-sampling, in that sequences preserve orthogonality under spectral repetition, spectral translation and spectral inversion. The system provides a management device to provide adaptation in transmit signals/waveforms/patterns as a function of channel and data source variations, such that communication data rates and capacities are maximized. The system can efficiently operate in multi-user multi-channel communication systems. The method implemented by the invention is split in its operation across the transmitter of the transmitting device and the receiver of the receiving device.

15 Claims, 15 Drawing Sheets

OTHER PUBLICATIONS

[Chi03] T. Ching-Hsiang et al., "Direct Downcovnersion of multiple RF signals using bandpass sampling," in Proceedings of the ICC'03 IEEE International Conference on Communications, vol. 3, pp. 2003-2007, May 2003, p. 73, 74, 75.

[ChKam01] J. Cheng, Y. Kamiya, and T. Ohira, "Adaptive beamforming of ESPAR antenna using sequential perturbation," in IEEE MTT-S Int. Microwave Symp. Dig., vol. 1, May 2001, pp. 133-136, p. 1 and Fig1.

[Chua98] C. Chuah et al, "Capacity of Multi-Antenna Array Systems In Indoor Wireless Environment" Proceedings of Globecom '98 Sydney, Australia, IEEE 1998, pp. 1894-1899 Nov. 1998.

[Cou95a] Alan J. Coulson; "A generalization of nonuniform bandpass sampling," IEEE Trans. Signal Processing, vol. 43, pp. 694-704, Mar. 1995.

[DanC96] Leonard J. Cimini, Babak Daneshrad, Nelson Sollenberger, "Clustered OFDM with Transmitter Diversity and Coding," Proc. Globecom '96, London, England, p. 703, 704, 707.

[Din86] Dinger, R., "A planar version of a 4.0 GHz reactively steered adaptive array," IEEE Transactions on Antennas and Propagation, Mar. 1986, pp. 427-431.

[DoYuIt04] Darren S. Goshi, Yuanxun Wang, and Tatsuo Itoh, "A Compact Digital Beamforming SMILE Array for Mobile Communications," IEEE Transactions on Microwave Theory and Techniques, vol. 52, No. 12, Dec. 2004, pp. 2732-2738.

[FrYuIt02] Jonathan D. Fredrick, Yuanxun Wang, and Tatsuo Itoh, "A Smart Antenna Receiver Array Using a Single RF Channel and Digital Beamforming," IEEE, IEEE Transactions On Microwave Theory And Techniques, vol. 50, No. 12, Dec. 2002, pp. 3053, Whole paper.

[FrYuIt04] Jonathan D. Fredrick, Yuanxun Wang, and Tatsuo Itoh, "Smart Antennas Based on Spatial Multiplexing of Local Elements (SMILE) for Mutual Coupling Reduction," IEEE Transactions on Antennas and Propagation, vol. 52, No. 1, Jan. 2004, pp. 106, whole paper.

[Fre02] J.D. Fredrick et al., "A Smart Antenna Receiver Array Using a Single RF Channel and Digital Beamforming," in 2002 IEEE MTT-S International Microwave Symposium Digest, vol. 1, pp. 311-314, Jun. 2002, Whole paper.

[GPP01] 3rd Generation Partnership Project; Technical Specification Group Radio Access Network; Physical Layer Aspects of UTRA High Speed Downlink Packet Access; (Release 2000), (3G Technical Report (TR) 25.848, version 0.2.1), Tdoc R1-01-0117, TSG-RAN WG1; Jan. 15-18, 2001, Boston, USA.

[Ges03] Gesbert, D.; Shafi, M.; Da-shan Shiu; Smith, P.J.; Naguib, A., "From theory to practice: an overview of MIMO space-time coded wireless systems," Selected Areas in Communications, IEEE Journal on, vol. 21 Issue: 3, Apr. 2003 pp. 281-302.

[Kiv03] D. Kivanc et al, "Computationally Efficient Bandwidth Allocation and Power Control for OFDM," IEEE Transactions on Wireless Communications, vol. 2, pp. 1150-1158, Nov. 2003.

[Kos94] Kostic, Z.; Titlebaum, E.L, "The design and performance analysis for several new classes of codes for optical synchronous CDMA and for arbitrary-medium time-hopping synchronous CDMA communication systems," Communications, IEEE Transactions on, vol. 42 Issue: 8, Aug. 1994, pp. 2608-2617.

[Kos02] Zoran Kostic and Nelson Sollenberger, "Performance and Implementation of Dynamic Frequency Hopping in limited bandwidth cellular systems, IEEE Transactions on Wireless Communications," vol. 20, No. 1, Jan. 2002, 28-31.

[Mar93] Maric et al., "A new family of optical code sequences for use in spread-spectrum fiber-optic local area networks," Communications, IEEE Transactions on vol. 41, Issue 8, Aug. 1993 pp. 1217-1221.

[Nog00] Gessé Eduardo Calvo Nogueira, Ademar Ferreira; "Higher order sampling and recovering of lowpass signals," IEEE Trans. Signal Processing, vol. 48, pp. 2169-2171, Jul. 2000.

[Pat01] M. Patel, J. J. O'Reilly, "The Effect of Oversampling on Aperture Jitter in Bandpass Sampling Receivers," University College London, London Communications Symposium, University College London, Sep. 8-9, 2001, 1901, 1902, 1904.

[Shiu00] D. Shiu et al, "Fading Correlation and Its Effect on the Capacity of Multi-Element Antenna Systems," IEEE Transactions on Communications vol. 48, No. 3, pp. 502-513 Mar. 2000.

[Tse03] T. Ching-Hsiang Tseng et al., "Direct Downconversion of multiple RF signals using bandpass sampling," in Proceedings of the ICC'03 IEEE International Conference on Communications, vol. 3, pp. 2003-2007, May 2003, 202-206.

[Tse98] D. Tse et al., "Multiaccess fading channels—Part 1: Polymatroid structure, optimal resource allocation and throughput capacities," IEEE Transactions Inform. Theory, vol. 44, pp. 2769-2815, Nov. 1998, 296-2799.

[Vau91] R. G. Vaughan, N. L. Scott, and D. R. White, "The theory of bandpass sampling," IEEE Trans. on Signal Processing, vol. 39, No. 9, pp. 1973-1984, Sep. 1991, all.

[Wint94] J. H. Winters et al, "The Impact of Antenna Diversity On the Capacity of Wireless Communication Systems", IEEE Transactions on Communications, vol. 42, No. 2/3/4, pp. 1740-1751, Feb. 1994.

[Wint87], "J. H. Winters, "Optimum combining for indoor radio systems with multiple users IEEE Transactions on Communications, vol. COM-35, No. 11, Nov. 1987, 1222-1224.

[Wo01] N. Wong and T.-S. Ng, "An efficient algorithm for downconverting multiple bandpass signals using bandbass sampling," Proc. IEEE Int. Conf. Commun., Helsinki, Finland, Jun. 2001, vol. 3, pp. 910-914.

* cited by examiner

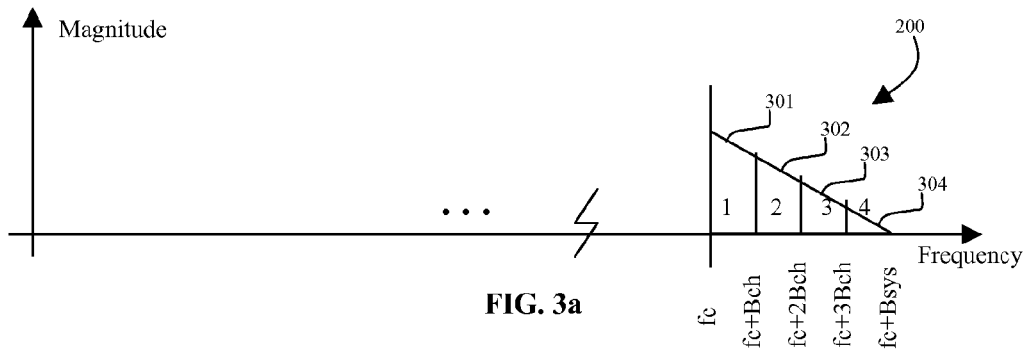
FIG. 3a
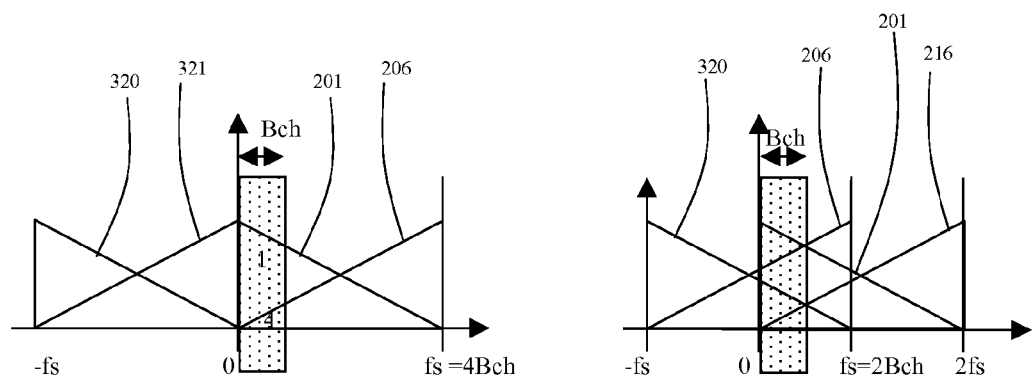
FIG. 3b
FIG. 3c
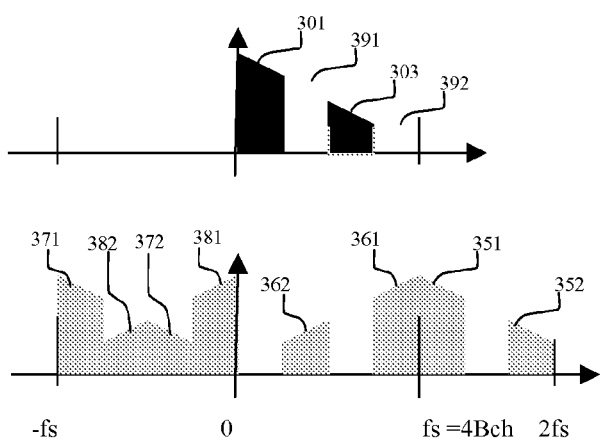
FIG. 3d

GENERIC RFIF RECEIVER

RFIF RECEIVER

GENERATOR OF OFDM SIGNAL WITH PROPERTIES THAT SUPPORT RECEIVER SUBSAMPLING

| #Antennas \ #Channels | 2 channels | 4 channels | 8 channels | 16 channels |
|---|---|---|---|---|
| 2 | N=2,M=2,o=1, C=1/2,P=1/2 | N=4,M=2,o=1/2 C=1/2,P=1/4 | - | - |
| 4 | N=1,M=4,o=4, C=1/4, P=1/2 | N=2,M=4,o=2 C=1/4,P=1/4 | N=4,M=4,o=1 C=1/4,P=1/8 | - |
| 8 | - | N=1,M=8,o=8 C=1/8,P=1/4 | N=2,M=8,o=4 C=1/8,P=1/8 | N=4,M=8,o=2 C=1/8,P=1/16 |

FIG. 15

METHOD AND SYSTEM FOR COMMUNICATIONS WITH REDUCED COMPLEXITY RECEIVERS

CROSS-REFERENCE TO RELATED APPLICATIONS

Not applicable.

STATEMENT REGARDING FEDERALLY SPONSORED RESEARCH

Not applicable.

BACKGROUND

1. Background—Field of the Invention

The present invention relates to communications systems utilizing reduced complexity receivers. The invention relates to systems where receivers typically have more than one receiving chain, such as in multiple-antenna wireless communications. The invention relates to a method and system for designing and combining transmit signals, in combination with receiving signals using digital signal sub-sampling, and using reduced number of analog receiver chains.

2. Background: Statement of the Problem

Reduction of complexity, cost, size and power consumption of communications systems and communication devices is a set of high priority targets for designers of communications systems. Modern communications receivers, such as multiple-antenna receivers in wireless systems, are traditionally comprised of multiple analog receive chains, which significantly increase receiver's complexity, cost, size and power consumption. It is highly desirable to design receivers with a reduced number of analog receive chains.

Several categories of techniques have been proposed for reduction of the number of analog receive chains below the number of receiver antennas. One category of techniques ignores signals from some of the antennas. Another category of techniques manipulates received signals in analog domain to orthogonalize components of the received signal. Yet another category of techniques uses high-rate digital signal sampling and/or sub-sampling. Most techniques are focused on single-link communications.

Previously proposed techniques suffer from lack of performance in some or all of the previous high priority targets. It is therefore of significant interest to provide a solution to reducing the number of analog receiver chains in receivers with multiple antennas, together with accompanying reduction in receiver complexity, cost, size and power consumption. The performance of the receivers needs to remain as good as of receivers using as many analog receiver chains as the number of receive antennas. The solution needs to be applicable in general multi-user multi-channel communication systems.

3. Background: Prior Art—General

Background material relevant to the present invention has been discussed in the fields treating the following problems: a) Multiple-antenna systems, b) Reduction in number of analog RF/IF chains for wireless receivers, c) Digital signal sub-sampling, d) Transmit signal orthogonality for wireless communications.

Background: Prior Art—Multiple Antenna Systems

Most current wireless communication systems are composed of nodes with transceivers containing a single transmit antenna and a single receive antenna. It was recently shown that the performance, data rate, capacity, coverage, signal-to-noise ratio, frequency reuse and power consumption of individual transceivers/users, as well as of wireless systems with many users, could be significantly improved if individual nodes/transceivers were built with multiple transmit and/or receive antennas. Such transceivers utilize space time signal processing to combat and/or take advantage of the effects of multipath fading and interference of transmitted signals while propagating through multipath-rich wireless channels. Such systems/transceivers are called "smart antenna" transceivers/systems. Smart antenna techniques can significantly improve today's wireless systems, such as cellular and wireless LAN systems using CDMA, TDMA, OFDM or other transmission techniques.

Performance, data rate and capacity improvements with multiple antennas can be accomplished by various processing techniques. Some of the processing techniques are: introduction of diversity gain, diversity combining, beam-forming, interference suppression, space-time coding, and multiple-input multiple-output (MIMO) techniques. Fundamental principles of smart antenna techniques have been described in ["The Impact of Antenna Diversity On the Capacity of Wireless Communication Systems", by J. H. Winters et al, IEEE Transactions on Communications, vol. 42, No. 2/3/4, pages 1740-1751, February 1994.]. According to one taxonomy of smart antenna systems, they can be classified into diversity-combining and beam-forming systems. Good overview of antenna processing techniques can be found in [Gesbert, D.; Shafi, M.; Da-shan Shiu; Smith, P. J.; Naguib, A., "From theory to practice: an overview of MIMO space-time coded wireless systems," Selected Areas in Communications, IEEE Journal on, Volume: 21 Issue: 3, April 2003 Page(s): 281-302. ]. Diversity-combining systems are further classified into time, frequency and space-polarization systems, whereas beam-forming systems are divided into switched and adaptive beam-forming systems. To utilize full potential of smart-antenna systems, it is required that magnitude and phase of signals emanating from individual antennas be preserved before combining them into the resulting optimally received signal. Interference-suppression techniques incorporating multi-antenna receivers with M receive antennas are capable of nulling up to M−1 interferers. MIMO techniques enable N signals to be simultaneously transmitted in the same bandwidth as only one signal, if/when using N transmit antennas, with the transmitted signal then being separated into N respective signals by way of a set of N antennas deployed at the receiver. This was described, for example, in ["Optimum combining for indoor radio systems with multiple users," by J. H. Winters, IEEE Transactions on Communications, Vol. COM-35, No. 11, November 1987], ["Capacity of Multi-Antenna Array Systems In Indoor Wireless Environment" by C. Chuah et al, Proceedings of Globecom '98 Sydney, Australia, IEEE 1998, pages 1894-1899 November 1998], and ["Fading Correlation and Its Effect on the Capacity of Multi-Element Antenna Systems" by D. Shiu et al, IEEE Transactions on Communications vol. 48, No. 3, pages 502-513 March 2000.].

Multiple-antenna transceivers with smart antenna processing techniques, for example a MIMO system with N transmit and N receive antenna elements, offers N-fold capacity increase relative to single-antenna system. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., ["On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998.]. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., ["Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.]. Patent application [2005/0175115 A1, Aug. 11, 2005, J, Walton et al., "Spatial Spreading in a Multi-Antenna Communication System"] proposes a method for taking advantage of multipath channels for MIMO systems.

To enable various smart antenna processing techniques, the following is required: a) That both a transmitter and a receiver have multiple antennas, b) That transmit and receive signals/waveforms be separated into a number of derivative sub-signals and processed in special signal processing ways, and c) That derivative sub-signals be distributed to transmit antennas (or from receive antennas), in special ways. Each derivative sub-signal that is transmitted to (or received from) an antenna, has to be identifiable (in magnitude and phase) and separable from other derivative sub-signals that need to be transmitted to (or received from) other antennas.

Since signals obtained from different antennas in smart antenna receivers are required to preserve magnitude and phase, the most straightforward implementation of smart antenna receivers is such that every antenna is followed by its own analog processing RF/IF chain. Each RF/IF chain downcoverts a signal from one antenna to low-IF or to baseband. There, the signal is digitally sampled in time for purposes of baseband digital signal processing. Usually, every RF/IF chain is comprised of amplifiers, one or more filters, one or more mixers/downconverters and an A/D converter (or a pair of A/D converters for complex signals). The existence of more than one analog RF/IF chain increases power consumption, size and cost of transceivers. One RF/IF chain in a single-antenna receiver accounts for about 30% of the receiver cost. This would suggest that a receiver with 4 chains would cost 90% more that a receiver with a single RF/IF chain. For an N-element array, the total number of RF channels required is N. Therefore, the hardware expense and power consumption of such a system is approximately N times those in a single antenna system. Furthermore, arrays with multiple feed lines and complicated RF circuits introduce more circuit noise and thus are more difficult to integrate into a small area. These are significant disadvantages of well known smart antenna transceivers.

It is therefore highly desirable to invent techniques where many receive antennas could share a reduced number of RF/IF chains (or a single chain) without loss of improvements that smart antenna systems offer.

Background: Prior Art—Reduction in Number of RF/IF Chains; Signal Sub-sampling

Several efforts have been made to design receivers with many antennas and with a reduced number of RF/IF chains (or single chain).

One approach [Adachi et al, "A Periodic Switching Diversity Technique for a Digital FM Land Mobile Radio," IEEE Transaction on Vehicular Technology, November 1978, pp. 211-219.] proposed the use of two antennas at the receiver followed by a switch which enabled the use of a single RF/IF analog processing chain to alternatively process signals coming from the two antennas, and combine them—thus offering the diversity gain. The method is limited in that, at desirable (low) switching rates, it creates digital signal aliasing (spectrum folding effect). Therefore, the switch has to run at undesirably high switching rates. At higher switching rates, large amount of aliased co-channel noise is propagated, significantly reducing operating signal to noise ratio (SNR) of the proposed receiver, thus making it not useful.

The second approach used adaptive loading on the reactive components' passive radiators to each antenna element, to control the individual signal phase before combining [J. Cheng, Y. Kamiya, and T. Ohira, "Adaptive beamforming of ESPAR antenna using sequential perturbation," in IEEE MTT-S Int. Microwave Symp. Dig., vol. 1, May 2001, pp. 133-136.]. The drawback of this approach and its derivatives [Dinger, R., "A planar version of a 4.0 GHz reactively steered adaptive array," IEEE Transactions on Antennas and Propagation, March 1986, pp. 427-431.] is that the signal phase and magnitude information is lost after combining.

In the third approach [S. Ishii, A. Hoshikuki, and R. Kohno, "Space hopping scheme under short range Rician multipath fading environment," in Proc. IEEE Veh. Technol. Conf., 2000, pp. 99-104.], the authors proposed a space-hopping scheme to reduce the number of RF/IF chains to one. This system consists of an array antenna and a switch that switches between the antennas repetitively. A major disadvantage of the approach is the existence of multiple delay lines, which replace multiple RF/IF chain, without obvious reduction is complexity, size, cost, and with unclear performance implications.

The fourth approach, called Spatial Multiplexing of Local Elements (SMILE), was presented in [Jonathan D. Fredrick, Yuanxun Wang, and Tatsuo Itoh, "Smart Antennas Based on Spatial Multiplexing of Local Elements (SMILE) for Mutual Coupling Reduction," IEEE TRANSACTIONS ON ANTENNAS AND PROPAGATION, VOL. 52, NO. 1, JANUARY 2004, pp 106-114.] and [ Jonathan D. Fredrick, Yuanxun Wang, and Tatsuo Itoh, "A Smart Antenna Receiver Array Using a Single RF Channel and Digital Beamforming," IEEE, IEEE TRANSACTIONS ON MICROWAVE THEORY AND TECHNIQUES, VOL. 50, NO. 12, DECEMBER 2002, pp. 3053-3058.]. SMILE offers reduction in hardware requirements for the smart antenna system through the use of a single RF/IF chain for all antennas, and of the sub-sampling of a single element of the incoming modulated carrier at a time. Compared to an N-element traditional smart antenna array, the SMILE offers an N-fold reduction in RF hardware, and reduces the power dissipation and circuit size. To avoid aliasing effects (overlapping of modulation spectrum), the minimum switching rate is determined by the Nyquist sampling theory, which is given by $Fs=B \times N$, where B is signal bandwidth, and N is the number of receive antennas. The SMILE approach suffers from the fact that the rate of the switching is substantially high, even though digital sub-sampling is used. In particular, the sampling rate is unacceptably high for multi-channel multi-user systems. For a typical multi-channel cellular system, according to SMILE, the minimally required sampling rate at the antenna switch is $Fs=Bsys \times N=Bch*Nch*N$ where N is the number of antennas in the receiver, Bch is single channel bandwidth, and Nch is the number of channels. This causes excessively high power consumption. Using this approach, no further reduction of switching rate is achievable, since it would result in unrecoverable loss of information due to signal aliasing.

The fifth set of approaches is focused on processing signals in analog domain, after the antennas, by providing methods for orthogonalizing signals prior to passing them through the reduced number of analog receiver chains. These approaches are presented in the following patents and patent applications: [2005/0053164 A1, Catreux, Severine et al., Mar. 10, 2005, "System and method for RF signal combining and adaptive bit loading for data rate maximization in multi-antenna communication systems."]; [2005/0105632 A1, May 19, 2005, Catreux-Erces, Severine et al., "System and method for channel bonding in multiple antenna communication systems."]; [2006/0029146 A1, Feb. 9, 2006, Catreux; Severine; et al., "Multi-antenna communication systems utilizing RF-based and baseband signal weighting and combining."]; [U.S. Pat. No. 7,006,810, Winters et al., Feb. 28, 2006, "Method of selecting receive antennas for MIMO systems."; 2006/0029149 A1, Kim; Hyoun-Kuk et al., Feb. 9, 2006," Method and apparatus for receiving signals in MIMO system."]. This set of approaches incurs significant implementation complexity in analog domain, aggravated by high frequencies at which the methods have to operate. This increases size, cost and power consumption, though potentially reducing the actual number of analog receiver chains.

Background: Prior Art—Signal Orthogonality

Signal orthogonality has been used to facilitate the design of successful wireless communications systems, such as CDMA-based cellular systems and OFDM-based wireless LAN systems. In prior art, signal orthogonality has been utilized to distinguish signals destined to different terminal stations, to distinguish signals transmitted from different base stations, and to reduce interference. The description of techniques and systems using orthogonal signals can be found in: [U.S. Pat. No. 6,553,019 B1, Apr. 22, 2003, Laroia et. al, "Communication System Employing Orthogonal Frequency Division Multiplexing Based Spread Spectrum Multiple Access."]; [U.S. Pat. No. 6,819,930 Laroia et al., Nov. 16, 2004, "Apparatus and method for use in allocating a channel resource in wireless multiple access communications systems."]; [U.S. Pat. No. 7,003,021 B2, Feb. 21, 2006, Gillhousen et al., "System and Method for Generating Signal Waveforms in a CDMA Cellular Telephone System.".], and [U.S. Pat. No. 7,020,110 Walton et al., Mar. 28, 2006, "Resource allocation for MIMO-OFDM communication systems."]. Although background material on orthogonality is useful for the invention in the present patent, the literature and patents on this topic do not address the issue of complexity reduction in receivers with multiple antennas and multiple analog receive chains.

Bakground: Prior Art—Summary of Disadvantages

Methods described in prior art suffer from one or more of the following inadequacies: a) They run at unaffordably high switching rates—with high power consumption; b) Signal-to-noise ratio is significantly degraded; c) Signal phase and magnitude information is lost; d) Multiple analog chains are replaced by other costly and complex components; e) Received signals experience unrecoverable aliasing; f) None of the known methods addresses or takes advantage of multi-user multi-channel wireless systems' peculiarities.

SUMMARY OF THE INVENTION

Objects and Advantages

The main objective of the present invention is to provide a new method and system for low complexity, low cost, small component size and low power communications. The invention applies to communications systems using receivers with multiple receiver chains. In particular, the invention applies to multiple-antenna wireless receivers, which have traditionally used multiple analog receiver chains which followed multiple receive antennas. The invention enables the use of low number (or one) analog RF/IF chains after multiple antennas in the receiver. The invention impacts the design of transmit signals, the management of transmit signals, and the design of multiple-antenna receivers.

The components of the invention are: a) Receiver method with ultra-low-rate sub-sampling of received signals, after signal capture by multiple antennas; b) Receiver with reduced number of analog RF/IF chains (or one chain), which propagates analog signals from multiple antennas to a baseband portion of the receiver; c) Transmit signal method to support ultra-low-rate sub-sampling of received signals, based on signals that maintain orthogonality under conditions of spectral translation and spectral inversion; d) Transmit signal management method to support dynamically changing channels in wireless systems, and to support packet-based source data rate variations in multi-user multi-channel systems.

Theoretical underpinnings of the invention are based on the avoidance of signal aliasing which is a byproduct of the ultra-low-rate digital signal sub-sampling. Digital aliasing is represented by digital spectrum repetition, translation, inversion and overlap. Elimination or reduction of aliasing is accomplished by novel cross-layer, combined transmitter/receiver design. The avoidance of signal aliasing, in this invention, is based on new judiciously created and/or selected transmit waveforms. In comparison to prior art, the invented orthogonal transmit signals are novel in that their orthogonality accomplishes not only user/channel plus base-station orthogonality, but also eliminates/avoids undesirable effects of aliasing caused by ultra-low-rate digital signal sub-sampling in sub-sampled receivers.

The invention enables high-capacity multiple antenna wireless system performance in multipath communications channels.

A suitable embodiment of the invention is based on the OFDM multiplexing-modulation wireless transmission and reception techniques, similar to those proposed for use in fourth generation cellular communication systems. For a loaded eight-channel OFDM-based cellular system using eight antennas in receivers, the invention could enable a per-user capacity gain of around four, and close to eight-fold receiver complexity reduction, in comparison to traditional system design, assuming the absence of some practical degradations.

The invention also applies, for example, to wireless LANs, peer-to-peer networks, down-link, and up-link cellular communications. The invention is also applicable in communications systems other than wireless communication systems.

BRIEF DESCRIPTION OF THE DRAWINGS

FIGS. 3a-3d show effects of sub-sampling on multi-channel communications system.

FIG. 15 shows an exemplary performance in capacity, power consumption and complexity as a function of the number of receiver antennas and number of channels in a wireless system.

DETAILED DESCRIPTION

Technical Background—Implementation of Multiple Antenna Transceivers

Radio transceivers operate at high frequencies and therefore, today, they are built from two separate stages: a) RF/IF-analog stage, and b) Baseband digital stage. Recent transceiver architectures are moving the boundary between the two stages closer to the antenna by reducing the span/size of the analog stage, and by increasing the span/size of the digital stage. Digital processing of signals offers flexibility and precision, but its deployment in radio receivers operating at hundreds of Megahertz is not fully justified today because of high power consumption and cost.

Technical Background—Sub-Sampling (Under-Sampling) Receivers

Sub-sampling radio architecture supports migration from analog RF/IF components into the digital signal processing (DSP) domain. The reason for migration is the difficulty of analog component design, and variability in analog components which causes signal imbalances. From the perspective of multiple RF/IF chains, there is great motivation to support the migration to DSP techniques. The theory of down-conversion sub-sampling radio receivers is presented in [Walt Kester, "Practical Analog Design Techniques," edited by Walt Kester. Norwood, Mass.: Analog Devices, Inc., 1995. ISBN 0-916550-16-8. Available from Analog Devices: Phone (781) 461-3392. Also available free on the Internet as PDF chapters. http://www.analog.com/support/standard_linear/seminar_material/index.html-Chapter 5]. Sub-sampling receivers perform signal sampling early in the radio chain, possibly even before the first stage down-conversion [R. G. Vaughan, N. L. Scott, and D. R. White, "The theory of bandpass sampling," IEEE Trans. on Signal Processing, vol. 39, no. 9, pp. 1973-1984, September 1991.], [D. M. Akos, M. Stockmaster, J. B. Y. Tsui, and J. Caschera, "Direct bandpass sampling of multiple distinct RF signals," IEEE Trans. Commun., vol. 47, no. 7, pp. 983-988, July 1999.], [T. Ching-Hsiang Tseng et al., "Direct Downconversion of multiple RF signals using bandpass sampling," in Proceedings of the ICC'03 IEEE International Conference on Communications, vol. 3, pp. 2003-2007, May 2003.].

FIG. 2 illustrates the principles of signal down-conversion and sub-sampling. In FIG. 2a, the spectrum of the transmitted signal after upconversion to the carrier frequency is represented by triangle 200. The bandwidth of the transmitted signal is Bsys, and the carrier frequency is fc. Carrier frequency is much higher than the bandwidth of the transmitted signal. Traditional receivers would typically downconvert the received signal by mixing (multiplying) the received signal with the carrier frequency fc.

Figure 2A:
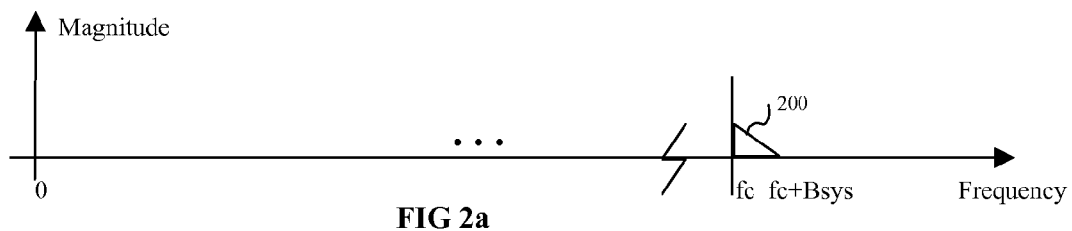
FIGS. 2a-2d show effects of sub-sampling on received signals.
Figure 2B:
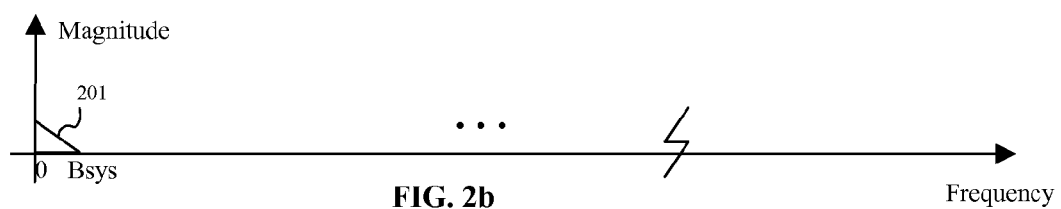

FIG. 2b shows the resulting signal 201, which is the same as the baseband spectrum of the transmitted signal, after downconversion using carrier frequency fc.

Figure 2C:
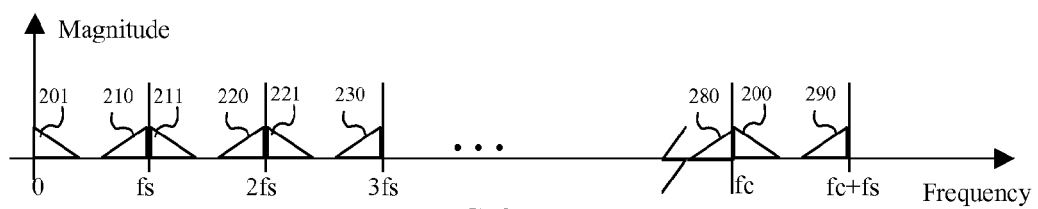

FIG. 2c shows the results of the operation of the sub-sampling receiver for judiciously chosen sampling frequency fs. Traditional sub-sampling receivers do not sample at carrier frequency rates, but use a much lower sampling rate which is at least twice the desired baseband signal bandwidth. In FIG. 2c, fs is chosen to be approximately 2.5 times as wide as the transmitted signal. The signal enters the antenna and is processed by the low-noise amplifier (LNA) amplifying all frequencies within its bandwidth. The amplified signal passes through a narrow bandpass filter centered above the carrier frequency, which attenuates frequencies outside of the information band. A sampling frequency fs defines the resulting sampled bandwidth as well as the arrangement of the aliasing spectral components. FIG. 2c shows the baseband component of the signal 201, as well as spectral replicas of the signal at integer multiples of fs (210, 211, 220, 221, 230, 280, 290). After sampling, both useful information as well as noise from each aliasing triangle within the analog input bandwidth of the ADC is folded into the sampled bandwidth. Thus, the information band is translated into the baseband without local oscillator mixing and image filtering. Sub-sampling has been used in wideband cellular base station receivers and in global positioning systems (GPS).

Figure 2D:
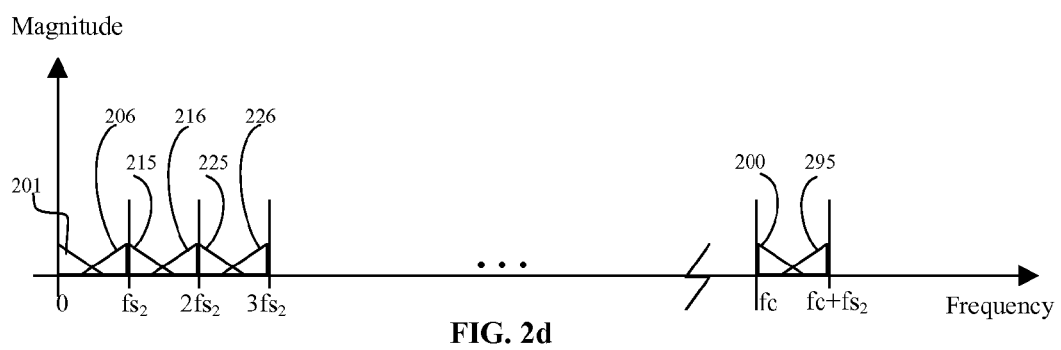

FIG. 2d illustrates spectral results of downconversion accomplished by using sub-sampling frequency fs which is lower than twice the bandwidth of the transmitted signal, fs=1.8*B. One can observe that spectral replicas 206, 215, 216, 225, 226, and 295 mutually overlap. In particular, spectral replica 206 overlies a part of the desired signal 201. The outcome of this overlap is that a received signal is a distorted version of the transmitted signal.

FIG. 3 illustrates the results of sub-sampling on the example of a modern multi-user, multi-channel cellular communications system. A multi-user wireless system typically supports a multitude of frequency channels. For narrowband systems, such as TDMA-based cellular systems, channel bandwidth is 30 KHz (American TDMA) or 200 KHz (European GSM), and the total number of channels supported in a total one way system bandwidth (25 MHz) is 833 or 125 channels. For wideband systems, such as CDMA or OFDM-based cellular systems, channel bandwidth is 1.25 MHz (IS-95, CDMA2000, 802.20 OFDM) or 5 MHz (WCDMA). Total number of channels per 25 MHz is thereby theoretically 20 or 5. To reduce noise, radio receivers usually have a wide-band filter that eliminates the bulk of the noise right at the radio front end (Bsys), in the case of cellular systems the filter being 25 MHz wide. Channel selection is done by mixing with a local oscillator with variable frequency such that final narrowband filtering is doable by a fixed narrowband filter with bandwidth equal to a single channel bandwidth. A frequency plan for a simplified hypothetical system with total bandwidth of 5 MHz and channel bandwidth of 1.25 MHz is shown in FIG. 3a. Front-end filter is assumed to have an ideal passband 5 MHz wide. In this hypothetical system, channel bandwidth is denoted as Bch, and the system bandwidth is denoted as Bsys. There are Nch=4 channels in the system. Using the nomenclature of the hypothetical system above, the previously proposed SMILE architecture puts a limit on the minimal sub-sampling rate at the antenna switch to be fs(min)=Bsys×N=Bch*Nch*N, where N is the number of antennas in the receiver. This assumes that one sample is needed per antenna branch. Such a multi-user system, if using the SMILE architecture, imposes significant burden on the switch sampling rate and impacts power consumption. Systems with even more channels would require even higher sampling rates, due to the fact that front end receive filters have to have large bandwidths sufficient to accommodate the whole system spectrum. This approach does not scale for portable receivers in multi-antenna, multi-user multi-channel wireless communications systems, where wide bandwidths require extremely high sapling rates to avoid catastrophic signal aliasing.

Ultra-Low-Rate Sub-sampling

The goal of the invention is to reduce the receiver sub-sampling rate as much as possible, and to make it significantly lower than the minimal sub-sampling rate required by SMILE architecture. FIG. 2c illustrated conditions under which sub-sampling will not result in aliasing, for traditional receivers. The use of sampling rates which we propose, and which are below the limit Fs=Bch*Nch*N, would generate signal aliasing in conventional system architectures, as illustrated in FIG. 3b for sampling rate which is half of the required minimum for SMILE architecture. Aliasing is shown in frequency domain. Desired signal spectrum is shown as 201. It is polluted by spectrally inverted signal 206. For signal spectrum 201, this would be an unrecoverable distortion due to aliasing.

FIG. 3c shows another example of aliasing. Frequency inverted signal spectra 206 and 216, as well as spectrally translated signal spectrum 320, fall on top of the desired signal spectrum 201. For signal with signal spectrum 201, this would results in unrecoverable distortion due to aliasing, where aliasing was caused by using sub-sampling frequency fs which was four times smaller than required by traditional sub-sampling methods.

Spectral Inversion of a Channel in a Multi-Channel System

From the perspective of spectral inversion of channels assigned for use to individual users in multi-channel systems, one can observe that the properties are a function of the properties of underlying signal waveforms. In general, efficient modulation schemes use complex-valued waveforms, and spectral inversion does not result in identical waveforms as the ones before spectral inversion. Some modulations are using orthogonal designs in the frequency domain (such as OFDM). In multi-user multi-channel system, it is possible to manage resources (frequencies, tones, time) such that spectral inversion (that is caused by sub-sampling) does not harm the ability to detect desired signals. This is accomplished by means of orthogonal dynamic resource allocation, such that parts of spectrally translated or inverted OFDM waveform fall in spectral segments where the original information-carrying form has no spectral presence.

FIG. 3d shows a conceptual signal having spectral content composed of spectral components 301 and 303. Bandwidth of 301 is Bch, bandwidth of 303 is Bch. Total bandwidth of the conceptual signal is not larger than four times Bch. When this conceptual signal is sub-sampled with sub-sampling frequency which is four times bandwidth of 301 (4*Bch), and only equal to the total bandwidth of the conceptual signal (or more precisely 3*Bch), the resulting translated and inverted aliasing components are shown in FIG. 3d. They are represented by translated spectrum 371 plus 372, spectrally inverted spectrum 381 plus 382, spectrally inverted and translated spectrum 361 plus 362, and spectrally translated signal 351 plus 352. One can observe that original conceptual signal spectrum does not overlap any of the aliased components created by the sub-sampling process. Therefore, FIG. 3d illustrates an example of a signal which is not degraded by ultra-low-rate sub-sampling.

FIG. 3d can also be interpreted as a spectrum plan of a wireless communications system with four channels. Channels represented by spectra 301 and 303 would indicate two channels that are active, and channels represented by absence of spectral content 391 and 392 are the two inactive channels in the spectrum between 0 and fs=4*Bch. In advanced design of receivers used for multi-channel communication systems, filter bandwidth would be equal to 4*Bch. If the sub-sampling rate used were the same (4*Bch), previously proposed receiver architectures would results in destructive aliasing. The theory exposed in the previous paragraph, for a single conceptual signal with spectral content 301 plus 303, applies in the case of the 4-channel system as well—there is no destructive aliasing due to ultra-low-rate under sampling in any of the two active channels. FIG. 3d therefore illustrates how a co-design of transmit signals (and/or population of transmit channels) with design of sub-sampling receivers can results in a novel and beneficial result.

Preferred Embodiment—Static Description of the Cellular System

Overcoming Signal Aliasing by System and Transmit Signal Design

Figure 1:
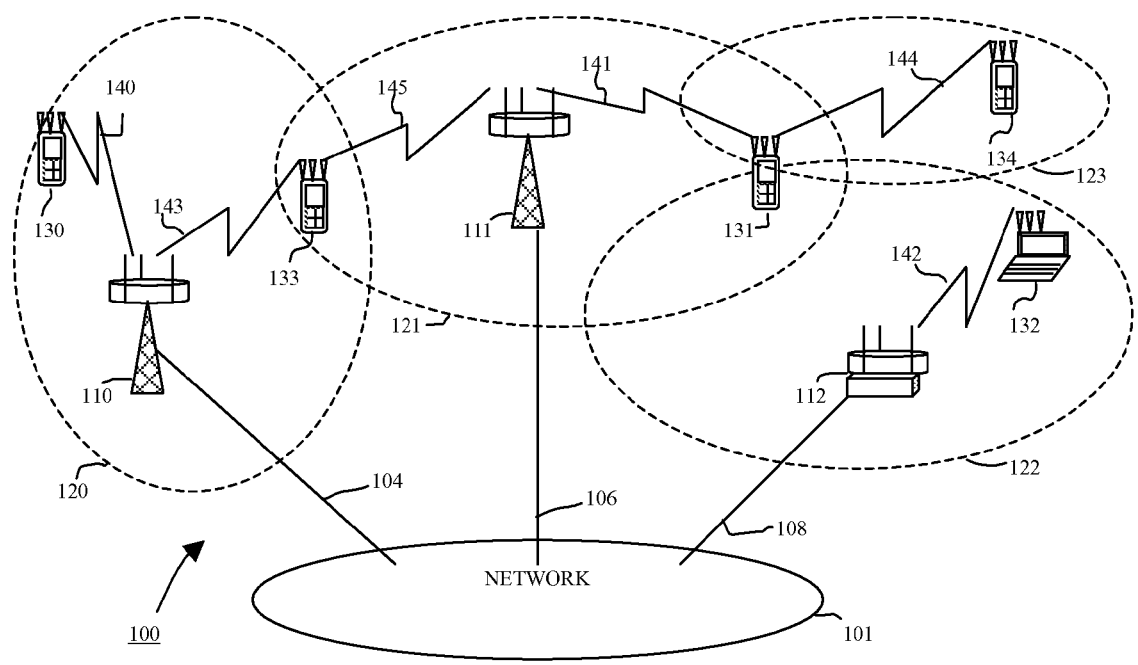
FIG. 1 shows an exemplary wireless communications system.
Figure 4:
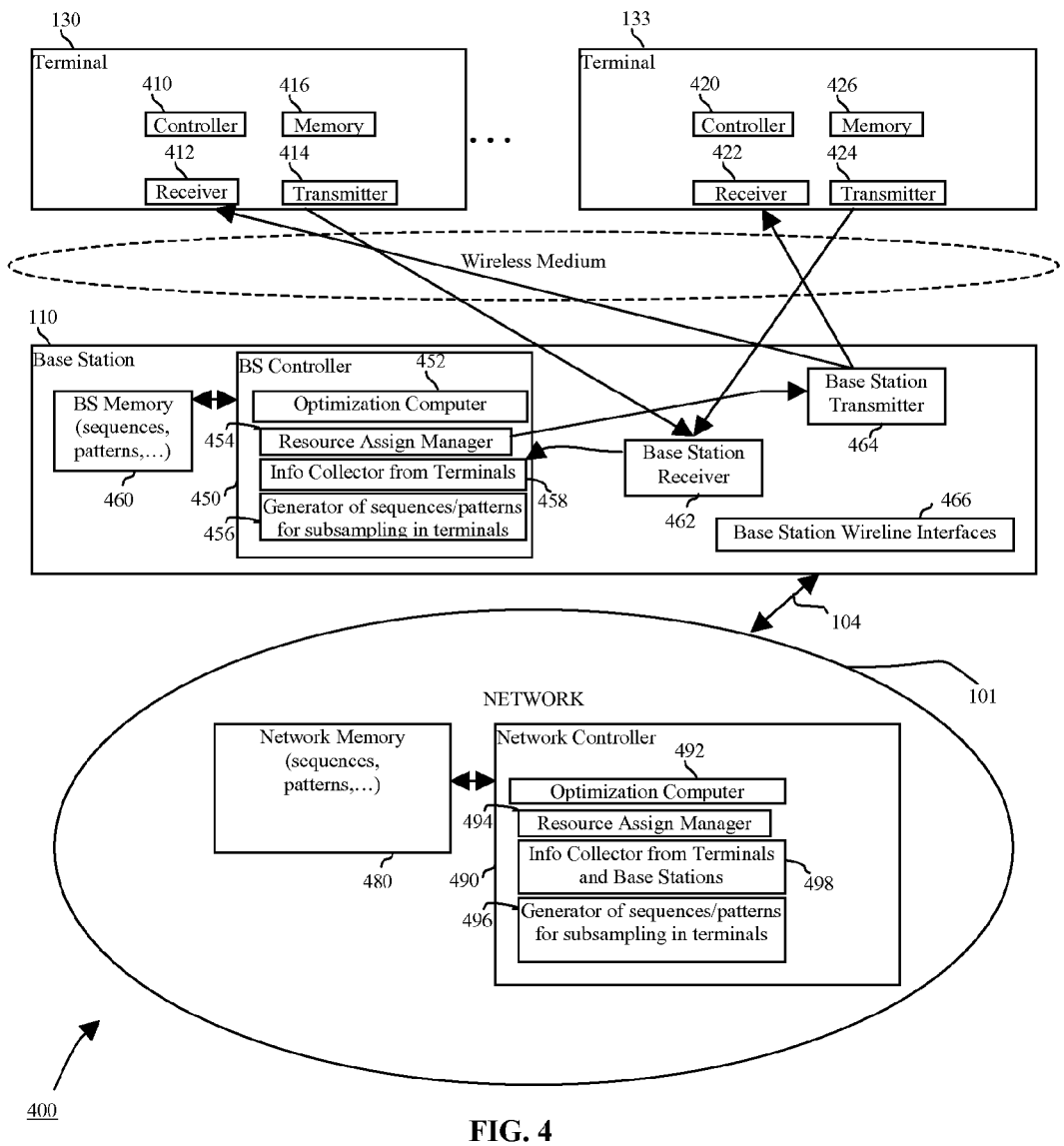
FIG. 4 shows exemplary base station in connection with terminals and in connection with a network.

FIG. 1 shows a cellular system 100 that supports receivers with ultra-low receiver signal sub-sampling. Generally, in a system without transmit signal constraints, receiver spectrum aliasing of undesirable channels in the desirable band is catastrophic—it is not possible to "undo" the aliasing. For a proposed multi-user multi-channel wireless communication system 100 and further detailed in FIG. 4, the effects of aliasing can be recovered from, by making sure that aliases fall in appropriate instantaneously inactive (signal orthogonal) spectral regions. In wireless systems such as shown in FIG. 1 and FIG. 4, a particular mobile receiver is interested in one channel only (for example 104), and for its purpose it needs to be guaranteed that no spectral aliases (translations, inversions) fall into its own channel.

The means by which aliasing is defeated is by the design of transmit signals (modulation, spectral shaping, orthogonality), channel multiplexing, and dynamic resource allocation schemes. This method, illustrated later in FIGS. 12a and 12b guarantees that frequency translation and/or frequency inversion/translation of the spectra of undesired channels (aliasing channels) preserve the orthogonality between the spectrum of the desired signal (channel) and aliasing signals (channels). Then, aliasing does not create a catastrophic effect (where the desired signal is not recoverable from the composite aliased signal). As compared to prior art, the orthogonality of the transmitted signals holds despite artifacts caused by ultra-low-rate sub-sampling.

The method which we invented to address the design requirements for the problem at hand is fundamentally based on the concept or ORTHOGONALITY of waveforms/channels and their spectral repetitions, translations and inversions. The method of transmit signal design can be deterministic or Ad-Hoc, and can used real time generation or memory-based readout. The method is illustrated in FIG. 12 and it will be explained later.

Wireless System Supporting Ultra-low-rate Sub-Sampling

FIG. 1 shows a wireless system 100. It contains a fixed-line network 101. Two cellular base stations 110 and 111, and one wireless LAN access point 112 are connected to the network, over fixed-line channels 104, 106 and 112. Cellular base stations 110 and 111 have multiple transmit antennas. Their regions of coverage are 120 and 121. Base station 110 communicates to cellular terminals 130 and 133 over wireless channels 140 and 143. Cellular terminals have multiple antennas. Base station 111 communicates with cellular terminals 133 and 131 using radio channels 141 and 145. Cellular terminal 133 receives signals both from base station 110 and 111. Cellular terminal 131 is a peer-to-peer terminal and it communicates with a peer station 134. WLAN access point 112 communicates with wireless LAN station 132 over wireless channel 142. Both data and control signals are communicated between components of this system.

FIG. 4 further elaborates on the components of the wireless system. Base station 110 contains memory 460, controller 450, wireless receiver 462, wireless transmitter 464 and wireline interfaces 466. Base station controller 450 further comprises of components that enable the design and deployment of signals/waveforms suitable for reception by sub-sampling multiple-antenna receivers in terminals 130 and 133. The controller comprises of optimization computer 452, resource assign manager 454, information collector device 458, and Generator of sequences/patterns/signals for sub-sampling in terminal 456. Wireline network 101 itself contains similar functionality (that can replace the functionality of base stations if desired). The elements of the network 101 are memory 480 and network controller 490. Network controller comprises of optimization computer 492, Resource assign manager 494, Information collector from terminals and base stations 498, and Generator of sequences/patterns for sub-sampling in terminals 496. For exemplary purposes, we show terminals 130 and 133 which contain controllers 410 and 420, memories 416 and 426, multiple-antenna sub-sampling receivers 412 and 422, and transmitters 414 and 424.

Figure 5:
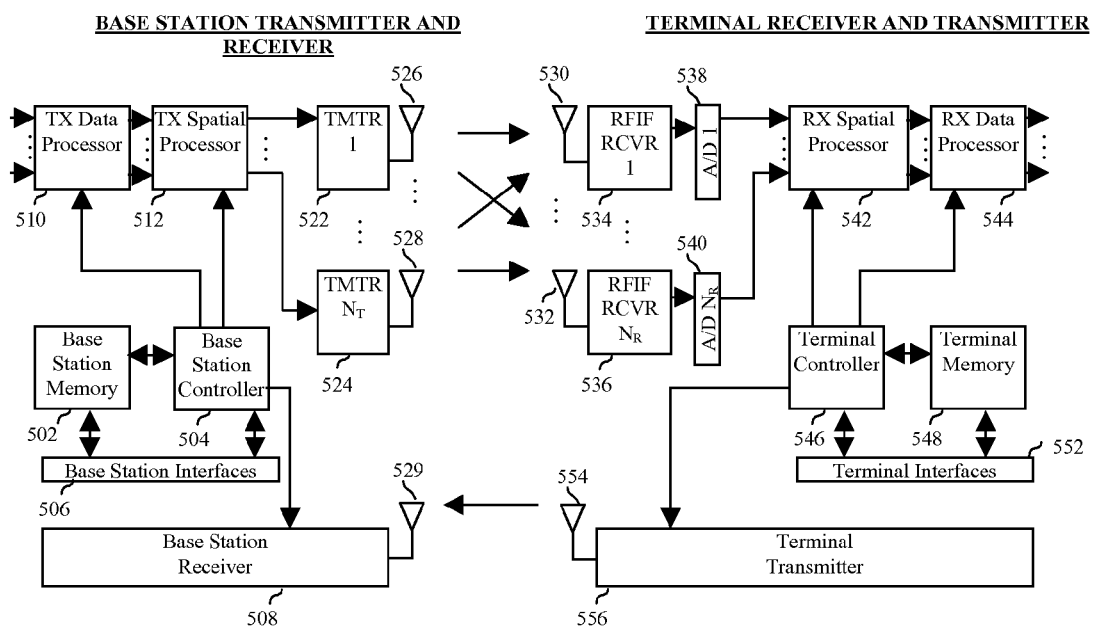
FIG. 5 shows an exemplary base station transmitter and receiver in connection with a terminal transmitter and receiver, for a traditional smart antenna system.

FIG. 5 shows the design of a traditional base station transmitter and a traditional terminal receiver for a multiple-antenna based communication system. This figure is shown to be used as a reference to indicate novel components of the patent in figures that follow later. Base station controller 504 controls all components and schedules their operation. The controller uses control data stored in memory 502 to properly configure and drive the components. Base station uses data processor 510 to interleave, code, modulate, spectrum spread input source data. TX spatial processor distributes the data and applies spatial processing methods such as space-time coding to allocate different date to different transceiver chains 522 to 524, of which there are $N_T$. Digital to analog conversion is included in 512. Each transmitter 522 to 524 is connected to its own antenna 526 to 528, of which there are $N_T$. A multipath-rich wireless channel is used for communication between the base station and the terminal. Base station also contains interfaces 506 and receiver 508.

The terminal in FIG. 5 comprises of $N_R$ antennas 530 to 532, each of which has its own RF/IF analog receiver chain 534 to 536. Each receiver chain is connected to its own analog-to-digital converter 538 to 540. (It is assumed that for complex signal receiver architectures, each line in this diagram indicates a complex signal. Then, each of the blocks 538 to 540 is actually a pair of A/D converters, one for real component, and one for imaginary signal component.) RX spatial processor 542 complement operations of TX spatial processor. RX data processor 544 complements operation of the TX data processor. Terminal is controlled by controller 546, which uses memory 548 for configuration of terminal components. Terminal also comprises terminal interfaces 552 and terminal transmitter 556.

Figure 6:
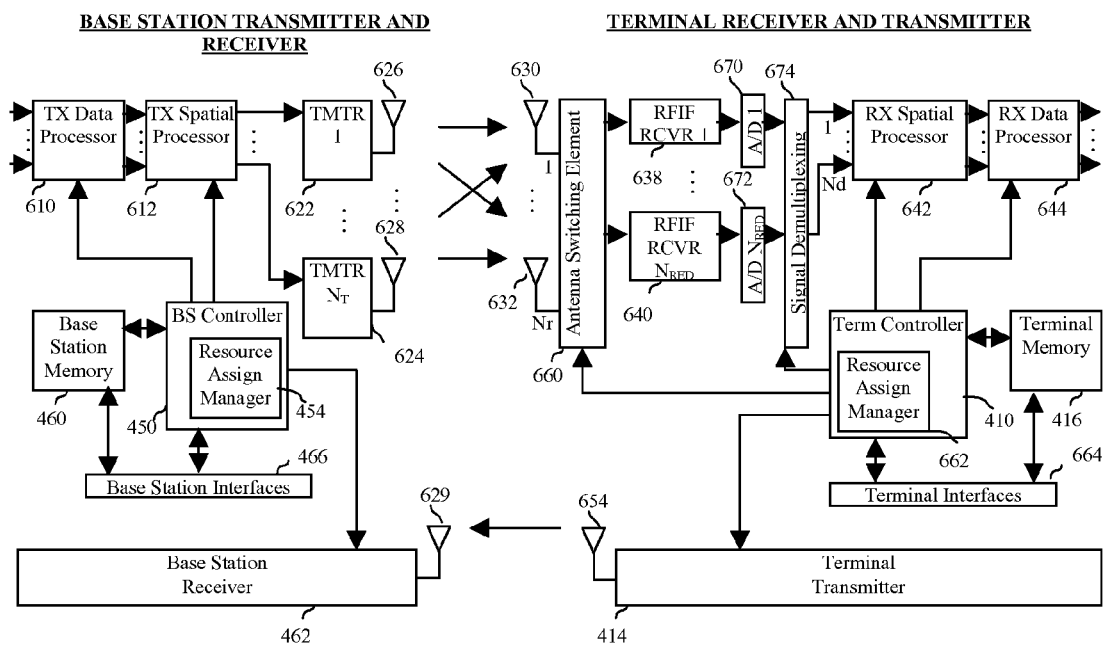
FIG. 6 shows an exemplary base station transmitter and receiver in connection with a terminal transmitter and receiver, with general-case switched sub-sampling terminal receiver.

FIG. 6 shows base station transmitter and receiver, and terminal receiver and transmitter for the proposed innovation. TX data processor 610 and TX spatial processor 612 perform similar operations to 510 and 512, except that signals/patterns/waveform that they use are now specially created by BS controller 450. Base station controller is explained in detail in FIG. 4. Resource assign manager is a critical element of the controller that makes sure that signals/waveforms/patterns are properly deployed to support sub-sampling architecture of the terminal receiver. Base station still has the same number $N_T$ of transmitters 622 to 624, and antennas 626 to 628.

The receiver of the terminal of FIG. 6 is an ultra-low-rate sub-sampling receiver. It contains $N_R$ antennas. A novel component is antenna switching element 660 that switches $N_R$ input analog signals into $N_{RED}$ (RED stands for reduced) processing paths for each of the $N_{RED}$ RF/IF receivers 638 to 640. Each of the RF/IF receivers is followed by its own analog to digital converter 670 to 672. $N_{RED}$ is smaller than $N_R$. Another novel component of the receiver is a signal demultiplexing element 674 which converts $N_{RED}$ signals into $N_d$ signals suitable for processing by RX signal processor 642. $N_d$ can be smaller, the same, or bigger than $N_{RED}$. RX signal processor 642 and RX data processor 644 perform operations complementary to operations of 612 and 610. Terminal controller 410 controls all receiver components including switching elements 660 and 674 for proper sub-sampling of multiple received signals received on antennas 630 to 632. Terminal controller uses resource assign manager 662 to coordinate with BS controller resource manager 454 in proper sub-sampling of the received signal. Although, in this figure, there exist separate antennas for transceiver and receiver, this is not a requirement or an obstacle to implementing the proposed system. It is possible to share antennas between Tx and Rx. The architecture of the transceivers can support both time-division duplex and frequency division duplex communication systems.

Figure 7:
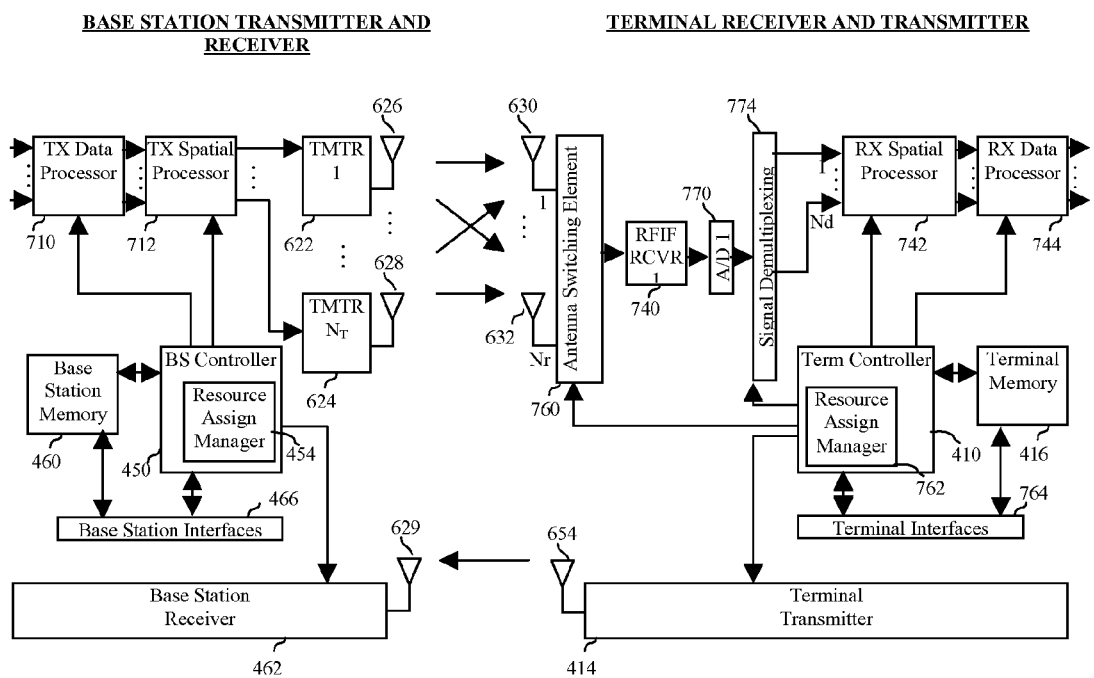
FIG. 7 shows an exemplary base station transmitter and receiver in connection with a terminal transmitter and receiver, with switched sub-sampling terminal receiver for one RF/IF chain.

FIG. 7 shows a base station transceiver and terminal receiver/transmitter when terminal receiver has only one analog RF/IF chain 740 to support passing signals from all antennas to one analog to digital converter. Antenna switching element 760 multiplexes $N_R$ signals into a single signal. Signal demultiplexor 774 demultiplexes one signal into $N_d$ digital signal streams for processing by RX spatial processor. Terminal controller 410 controls 760 and 742 for proper sub-sampling of signals, according to resource assign manager 762 specifications. Resource assign manager learns about proper configurations and operation sequences through the messaging system i.e. control data received from the base station. Resource assign manager 762 of the terminal needs only to be aware of a part of information managed by base station resource assign manager 454, which manages a multitude of terminals. Although, in this figure, there exist separate antennas for transceiver and receiver, this is not a requirement or an obstacle to implementing the proposed system. It is possible to share antennas between Tx and Rx. The architecture of the transceivers can support both time-division duplex and frequency division duplex communication systems.

RF/IF Receiver Chain

Figure 8A:
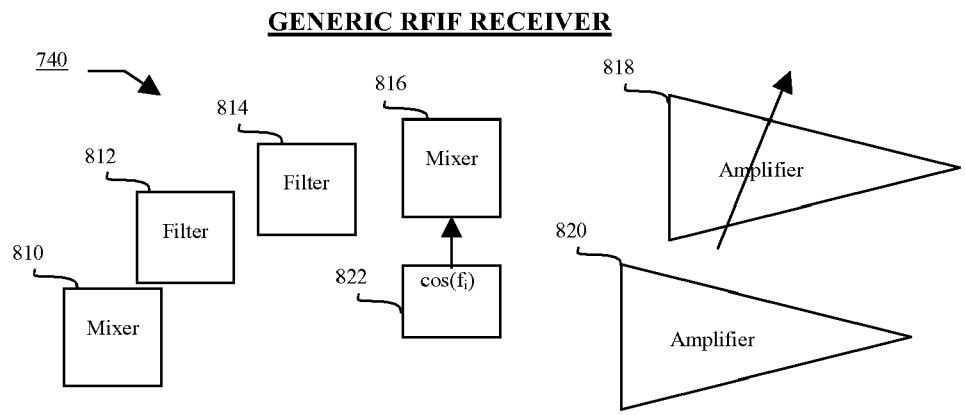
FIGS. 8a and 8b show an exemplary generic RF/IF receiver and one particular RF/IF receiver.

FIG. 8a shows a conceptual diagram of one receiver RF/IF chain. It comprises of a number of filters 810-814, number of mixers 816, and a number of amplifiers 816-820. The invention disclosed herein will work for a variety of RF/IF chain architectures.

Figure 8B:
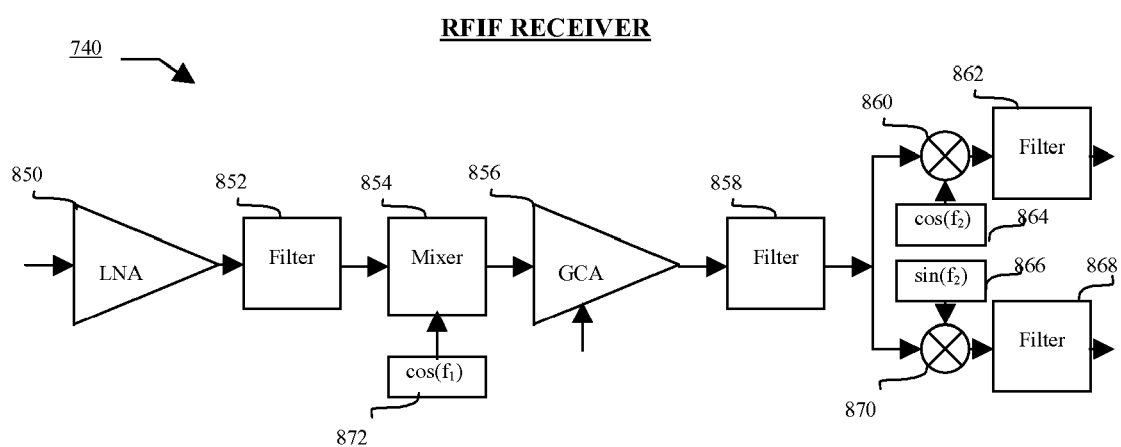

FIG. 8b shows a block diagram of an exemplary RF/IF receiver chain. It comprises low noise amplifier 850, wideband filter 852, first mixer 854 which uses frequency f1 for downconversion, variable gain amplifier 856, narrowband filter 858, baseband downconverters 860 and 870 for real and imaginary components and filter 862 and 868. Typically, 30% of cost of terminals applied to RF/IF transceiver chains.

Generator of OFDM Signal for Ultra-Low-Rate Receiver Sub-Sampling

Figure 9:
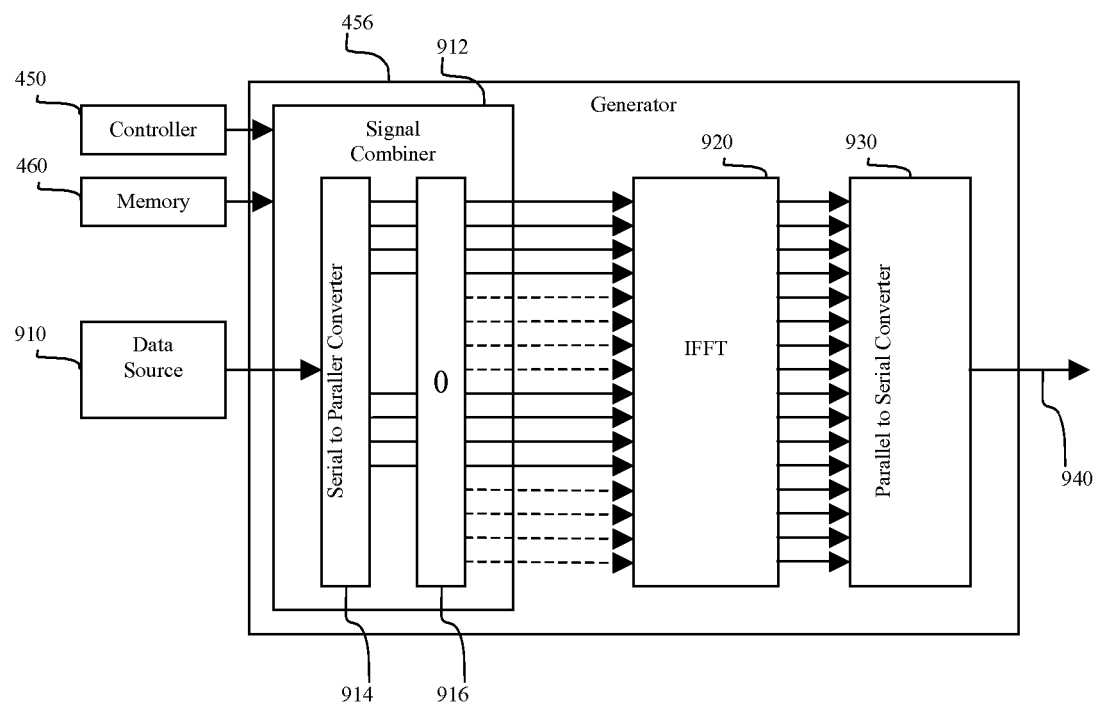
FIG. 9 shows an exemplary generator of OFDM signals with properties that support receiver sub-sampling.

FIG. 9 shows a block diagram of an exemplary generator 456 (of FIG. 4) of the OFDM signal/waveform/pattern that exhibits properties suitable for ultra-low-rate sub-sampling receivers. This OFDM signal maintains orthogonality under operations of spectral inversion and spectral translation for a select set of sub-sampling sampling rates. This implementation of generator, 456, combines input data at frequency inputs of the IFFT processor 920, with zero inputs at select frequency inputs of the IFFT processor. Prior to being processed by generator, the data is serial to parallel converted by 914 and after IFFT, the signal is parallel to serial converted by 930. Signal 940 exhibits properties suitable for ultra-low-rate receive signal sub-sampling.

Process in Base Station Supporting Ultra-Low-Rate Sub-Sampling Receivers

Figure 10:
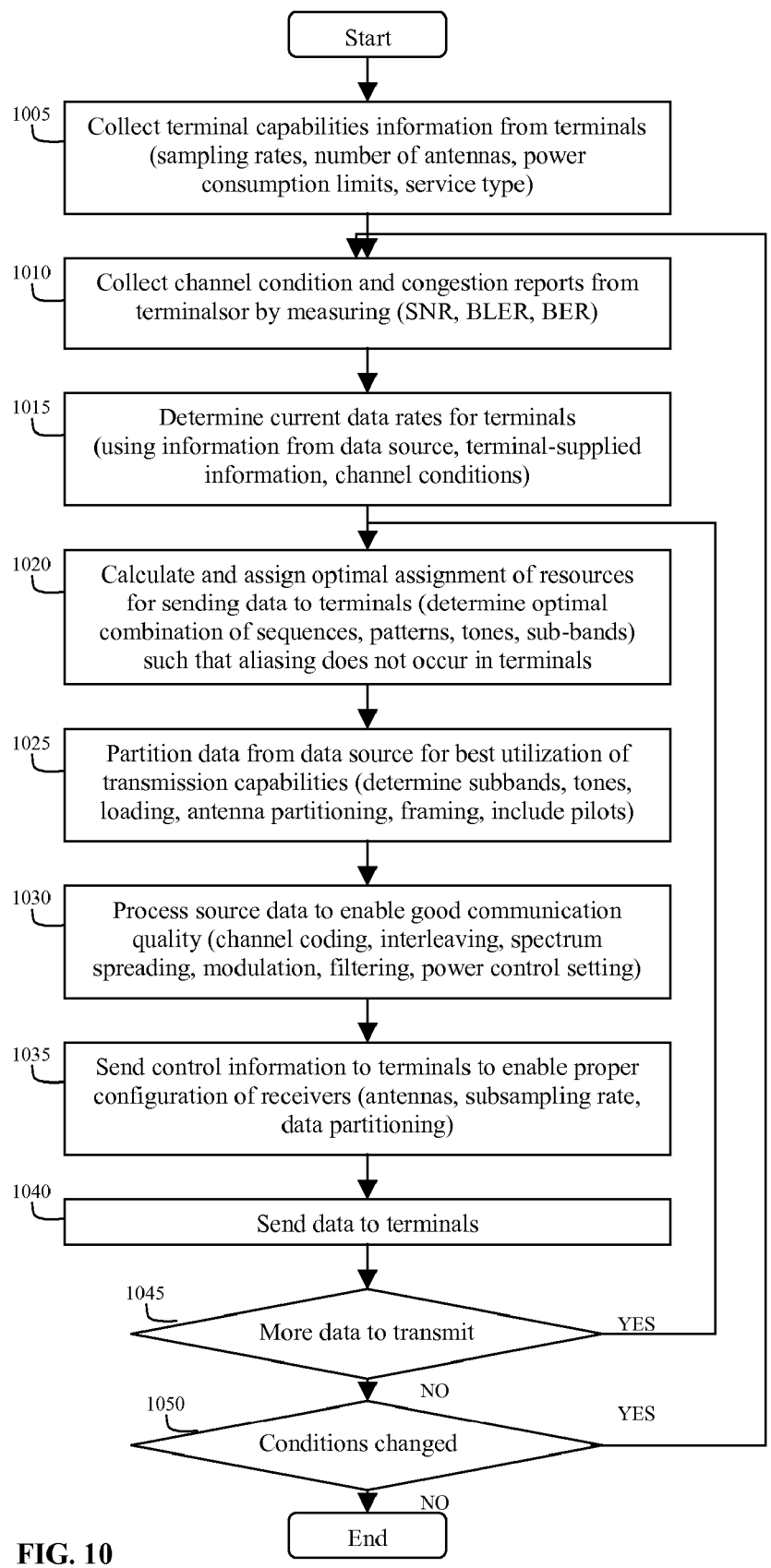
FIG. 10 shows a flowchart of an exemplary process of a base station controller for managing signal allocation supporting sub-sampling in terminals.

FIG. 10 is a flow chart of an exemplary process performed in the base station 100 of the system which supports ultra-low-rate sub-sampling receivers. In the first step 1005, the base station collects information from all terminals that it communicates with about their supported sampling rates, number of receiver chains, number of antennas, power consumption limits, service type and other. In the second step, which is repeated more often, the base station collects channel condition and congestion information from terminals or by means of its own measurements. This information, together with data source information, is used to determine instantaneous data rates for all terminals in step 1015. In step 1020, a crucial step of calculation and assignment of waveforms/signals/patterns is performed, to satisfy the requirement for ultra-low-rate sub-sampling receivers in all terminals supported by this base station. Orthogonality of signals is maintained under spectral translation and spectral inversion conditions. Step 1025 partitions input data destined to individual receivers, for best utilization of transmitter resources. In step 1030, the data is processed by interleavers, modulators, spreaders, coders and other. In step 1035, information about sequences/patterns/waveforms used to support sub-sampling, is communicated through a control channel (in band or out of band) from transmitter to each individual terminal receiver. In step 1040, data is sent from base station to receivers. Parts of the process are repeated, as a function of more data to be transmitted and changing source, channel or terminal configuration conditions.

Process in Terminal Supporting Ultra-Low-Rate Sub-Sampling Receivers

Figure 11:
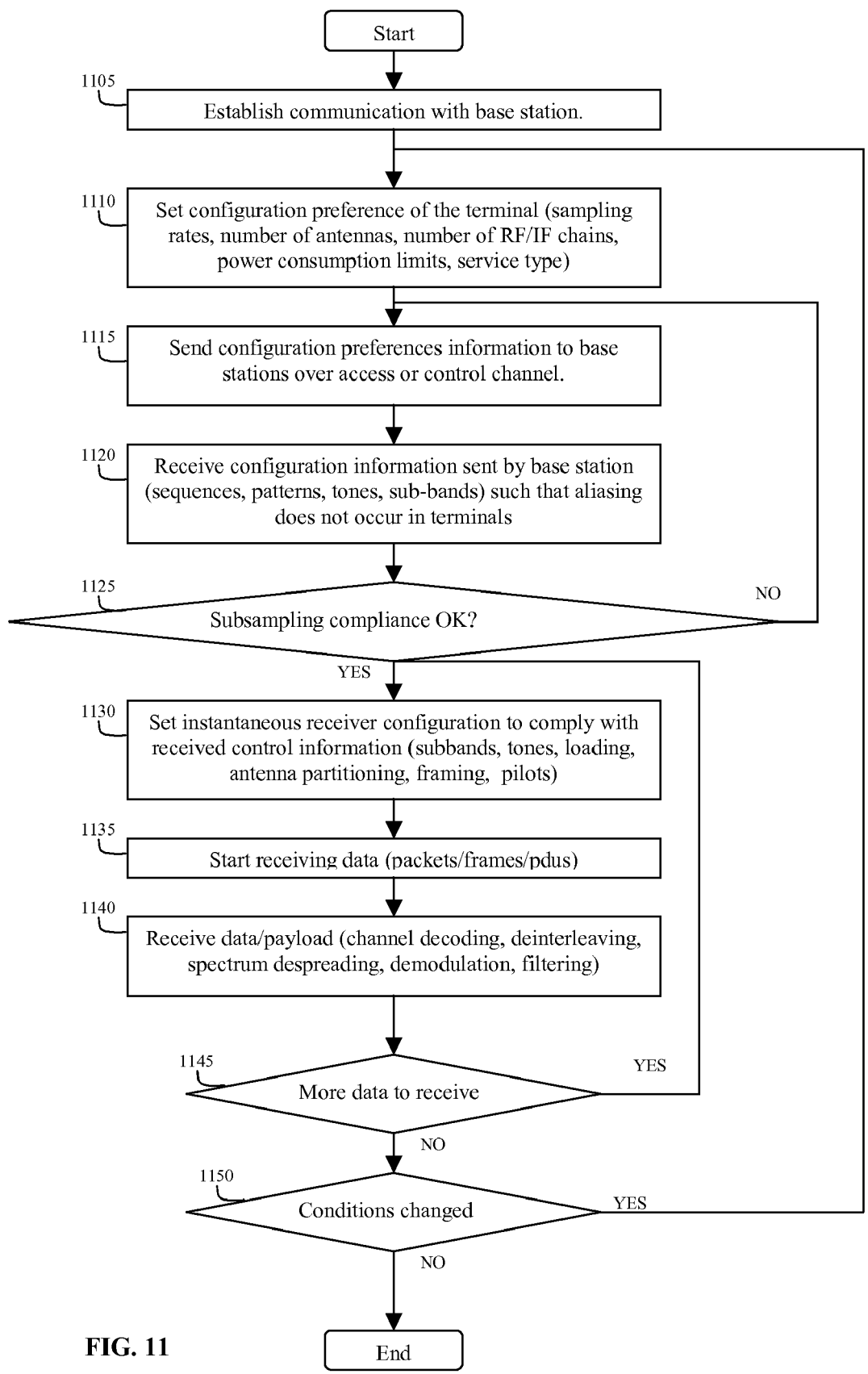
FIG. 11 shows a flowchart of an exemplary process of a terminal controller for managing terminal receiver operation.

FIG. 11 is a flow chart of an exemplary process which supports the operation of the receiver with using ultra-low-rate sub-sampling. In the first step 1105, terminal establishes communication with base station. In step 1110, the terminal sets its configuration including sampling rate, number of antennas and receiver chains, service type and other. In step 1115, configuration information is sent to corresponding base stations over access or control channels. In the next step 1120, the terminal receives configuration instructions from the base station(s) which control the terminal such that sub-sampling would be supported. The terminal verifies this information against its own configuration information in step 1125, and in case of discrepancies, goes back to step 1115. If compliance is verified, step 1130 is executed where receiver operation configuration is set according to instructions. The terminal receives data in step 1135 and receives payload in step 1140. If there is more data to receive, the process is repeated with step 1130. If conditions or configurations need to change, the operations are repeated starting with step 1110.

Figure 12A:
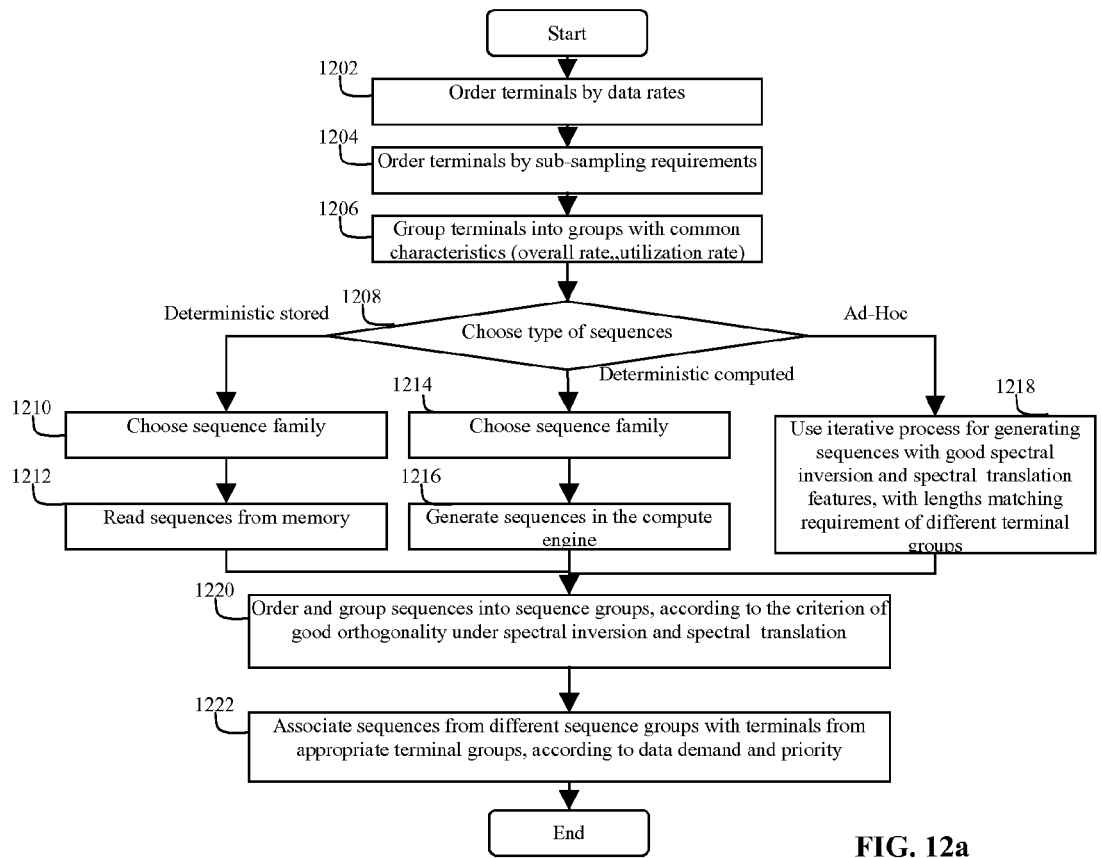
FIGS. 12a-12b show flowcharts of exemplary processes for generating transmit signals (sequences, patterns) supporting sub-sampling in terminal receivers.

Process in Base Station for Generating Signals/Patterns/Waveforms Supporting Sub-Sampling Receivers FIG. 12a is a flowchart of an exemplary process for generation of signals/waveforms/patterns which support ultra-low-rate sub-sampling receivers. In step 1202, all terminals are classified according to desired data rates. They are further classified according to their sub-sampling requirements in step 1204. Terminals are next grouped into groups with common characteristics in step 1206. Next, a method of generation is selected in step 1208. If deterministic sequences are used, the family is chosen in step 1210, and individual sequences are read from the memory, or generated in real time using software or the compute engine. If Ad-Hoc methodology is used for generating sequences, than an iterative process 1218 is commenced for generation of sequences with good properties. In step 1220, sequences are ordered by length and utilization, and grouped into sequence groups. In step 1222, generated sequences are associated with individual terminals from appropriate terminal groups, according to data demand and priority.

Figure 12B:
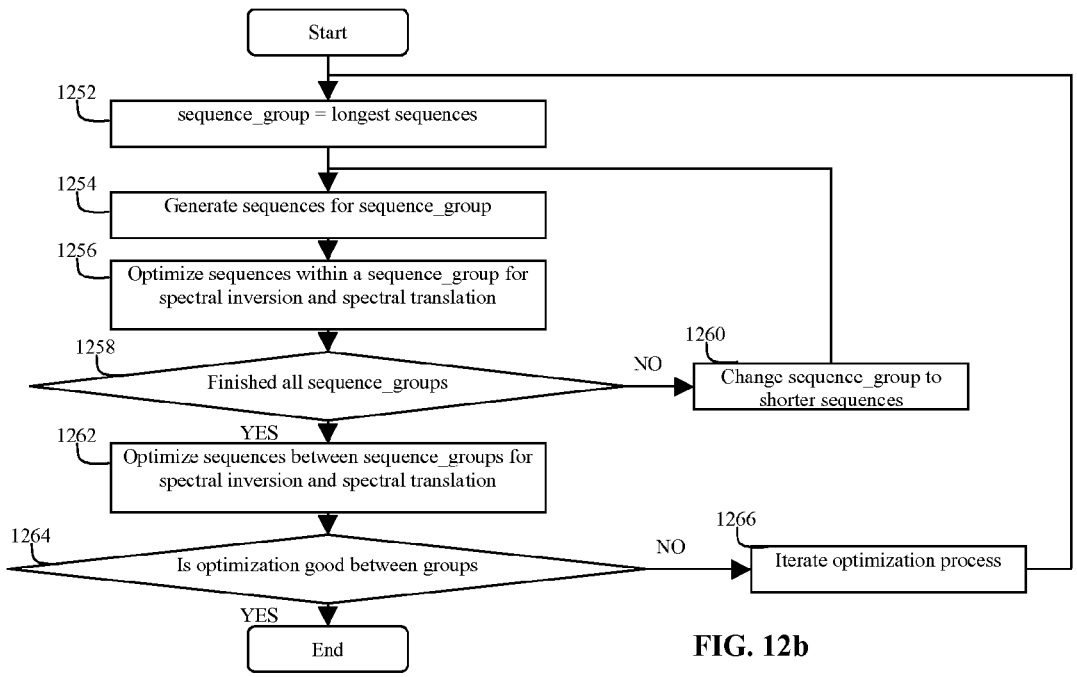

FIG. 12b is a flow chart of an exemplary process for iterative generation of Ad-Hoc sequences supporting sub-sampling receivers. In the first step 1252, a set of longest needed sequences are generated. In the following steps 1258, 1260, sequences of smaller and smaller lengths are generated sequentially, but only of lengths, and in quantities needed by communicating terminals. Sequences are continuously optimized for maintenance of properties supporting sub-sampling receivers, in step 1262.

Sub-Sampling Switching Elements

Figure 13A:
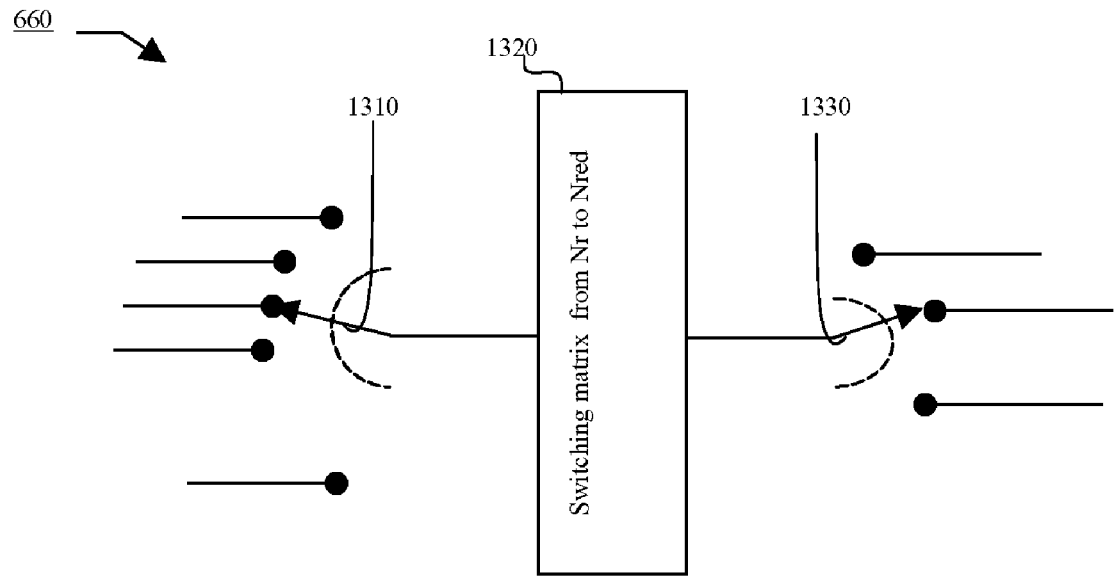
FIG. 13 shows an exemplary antenna switching element and an exemplary signal demultiplexing element.
Figure 13B:
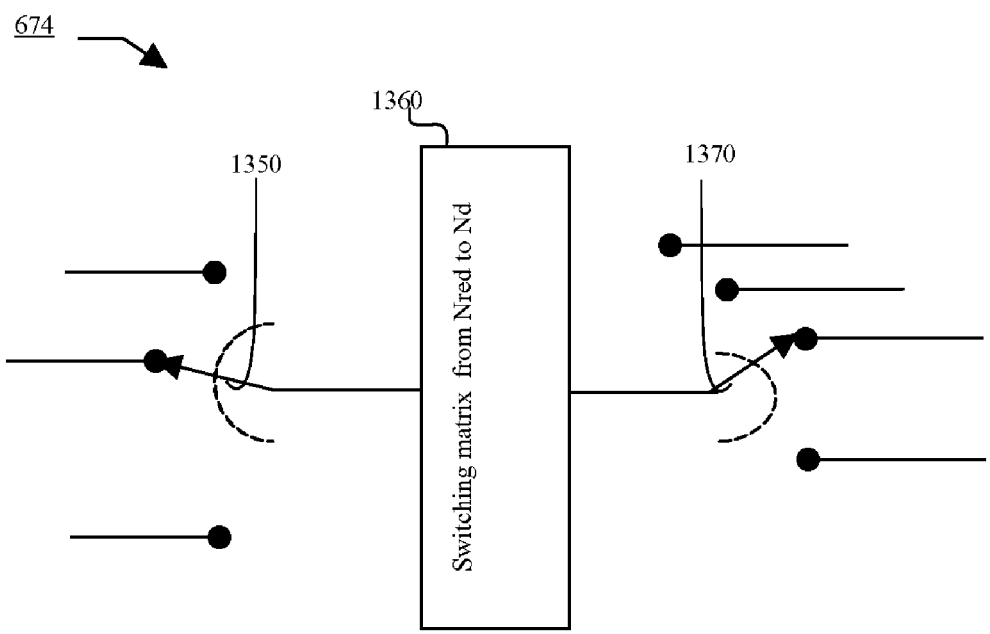

FIG. 13a is a block diagram of an exemplary antenna switching element 660 that comprises input multiplexer 1310, switching matrix 1330 from Nr to Nred quantity of signals, and demultiplexor 1330. FIG. 13b is a remultiplexor 674 that comprises multiplexer 1350, switching matrix 1360 from Nred to Nd, and demultiplexor 1370.

OFDM-Based System Implementation and Signal Design for Sub-sampling Receivers

OFDM is used in wireless LAN standards (802.11a) and it is the primary contender for the 4th generation cellular based systems (standard IEEE 802.20, 802.16 mobile) and ultra-wideband communication systems (IEEE standard 802.15.3a ["Ultra-Wideband Radio in Multiaccess Wireless Communications,", Special Issues on, IEEE Journal on Selected Areas in Communications, December 2002, Vol. 20, Num. 10.]). The use of OFDM [D. Kivanc et al, "Computationally Efficient Bandwidth Allocation and Power Control for OFDM," IEEE Transactions on Wireless Communications, vol 2, pp. 1150-1158, November 2003.] in multi-user wireless systems has been facilitated by taking advantage of the following: (a) OFDM robustness to multipath; (b) Variable instantaneous wireless channel behavior (frequency/tone selective fading) between a base station and each individual mobile station (as utilized in multi-user diversity); (c) The ability of OFDM to support flexible resource allocation and link adaptation—to have individual tones (or groups of tones) set to arbitrary relative powers or use different modulation schemes per tone; (d) The ability of embedding time-evolving tone hopping (frequency hopping) per tone or per tone-group (flexible allocation of subcarriers to a user or some logical channel by 2-D resource allocation means) as a function of wireless channel state [Leonard J. Cimini, Babak Daneshrad, Nelson Sollenberger, "Clustered OFDM with Transmitter Diversity and Coding," Proc. Globecom '96, London, England.].

A method disclosed in our invention involves the design of transmit signals for numerous individual receivers such that even in the presence of spectral overlap and spectral inversion of signals, the orthogonality between signals/waveforms is maintained. OFDM is particularly suitable for this design, since OFDM signal contains a large number of orthogonal narrowband tones.

Figure 14:
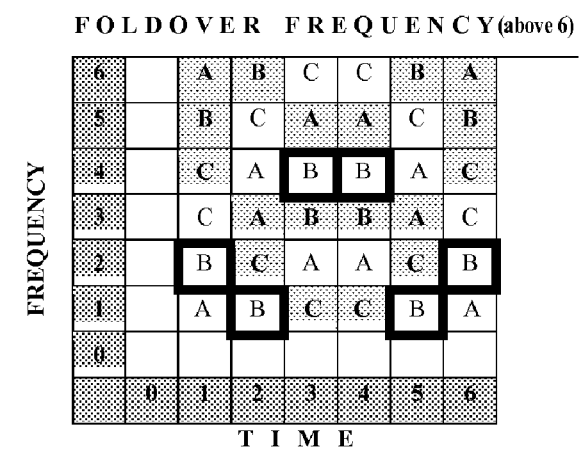
FIG. 14 shows an exemplary tone assignment transmit signal pattern, or a channel distribution supporting sub-sampling in terminal receivers.

With OFDM, it is possible to design a multi-user system with total bandwidth of Bt and an OFDM symbol with a large number of tones (subcarriers) covering the total system bandwidth. This corresponds to FIG. 3 and to the way that base station 110 in FIG. 1 uses spectrum for transmission to terminals. Each individual user at any one instant of time can use only a subset of tones, this subset being different from the subset of tones used at that instant by any other user. With evolution of time, the tones used by a particular user can be changing, which introduces the notion of tone hopping. Such a system, in fully synchronous conditions (such as base station downlink transmission), can thereby contain a large number of fully orthogonal transmissions destined to different users. In asynchronous conditions, the interference by signals for different receivers can be minimized by minimizing the number of instantaneous tone hits, and corrected for by means of channel coding. This mathematically problem has been studied in the frequency hopping context [Kostic, Z.; Titlebaum, E. L, "The design and performance analysis for several new classes of codes for optical synchronous CDMA and for arbitrary-medium time-hopping synchronous CDMA communication systems," Communications, IEEE Transactions on, Volume: 42 Issue: 8, August 1994, Page(s): 2608-2617.]. Further expansion of such a system involves deploying a number of wideband channels, each with bandwidth of Bt, such that the channel planning is similar to what we propose is shown in FIG. 3a. Such a system, when deployed with multiple antenna receivers, is the best example for the application of this invention. It offers the ability to design a large number of orthogonal signals, and features spectral overlap and spectral inversion due to sub-sampling. In FIG. 14, we illustrate how a group of tones can be frequency hopped with evolution of time (user B example).

OFDM Orthogonal Signal Design Method:

The mathematical problem of the principal idea behind the present invention can be defined as: Construct a set of integer sequences of length L such that they are pair-wise mutually orthogonal, as well as pair-wise orthogonal with any of the index inverted versions of the same sequences.

Quadratic Congruence Sub-sampling Orthogonal Sequence Design Method

A subset of the family of number theoretic based Quadratic Congruence integer sequences can be designed to satisfy the proposed design constraints: A family of integer quadratic congruence sequences is defined as $1(a,p)=ak^2 [\mod p]$ where a, k and 1 are integers, $k=0,1,\ldots,p-1$; $a=0,1,\ldots,p-1$; p is a prime number and 1 is a sequence of length p. One sequence is obtained by fixing a and computing $1(a,p)$, where sequential values of the sequence are obtained by varying integer k. An example is illustrated in FIG. 14a for prime number p=7 where 7 sequences of length 7 are constructed, each of which can be read from one row (example $1(2,7)=(0,2,1,4,4,1,2)$ read from the third row from below) of FIG. 14a. Such integer sequences can be used to define sequences of frequencies used by users in a tone hopping OFDM communication system. FIG. 14b illustrates how three users A, B, C use the frequency space in tone hopping patterns (clear squares with light font). FIG. 14a shows the Generation of quadratic congruence sequences for sub-sampling receivers and their assignment to 3 users A, B and C; FIG. 14b shows frequency hopping patterns for users A, B and C and frequency inverted frequency hop patterns for users A, B and C. Inverted patterns are represented by shaded squares with bold letters A, B and C. User B is marked by cells with heavy border lines in both FIGS. 14a and 14b. For practical reasons, to prevent common use of any one single frequency by more that one user at the same time, and to eliminate a user having the same frequency throughout the signal period, two constraints are defined: (i) sequence $1(0,p)=(0,0,0,0,0,\ldots,0)$ is never used; (ii) first integer in any of the sequences (always equal to 0) is skipped in the generation of tone hop patterns. So for prime number 7 we can design 6 frequency hop patterns of length 6 which are mutually orthogonal.

In an unconstrained tone-hopping system using the above example one would use the 6 frequency hopping patterns for 6 different users. However, the sub-sampling which creates spectral overlap and frequency inversion imposes an additional constraint on the orthogonality. Suppose that the foldover frequency is just above the frequency indexed by integer 6 in FIG. 14b. Frequency-inverted copy of the spectrum of all present users will fall into the frequency space of the spectrum of the original signals. Thereby, in the example, not all of the 6 sequences are used to design frequency hop patterns for distinct users. We only define three users A, B and C. Spectral inversion and mathematical properties of quadratic congruence sequences guarantee that spectrally inverted signals of those 3 users will fall into frequency locations that are not occupied by any original user. For instance, in FIG. 14b, spectrally inverted signal of user B will occupy frequency locations (5,6,3,3,6,5). This can be mathematically obtained by using modulo arithmetic $p-1(a,p)[\mod p]$ on the sequence $1(2,7)=(2,1,4,4,1,2)$. Beyond orthogonality, Quadratic Congruence sequences have remarkable correlation properties, which can be further utilized in the system design.

It is also possible to allocate resources (tone, frequencies, codes) such that a single user grabs most of the resource. For example, in FIG. 14, a super-user S would grab all the available resource that are in FIG. 14 allocated to users A, B and C. Sub-sampling orthogonality would remain valid, and super user S would monopolize communication over the channel.

In OFDM systems, proposed for next generation cellular systems [Document 3GPP TR 25.814, Physical Layer Aspects for Evolved UTRA, Section 7.1.1.2.1 on Downlink data multiplexing], the proposed sequence design can be used directly such that physical resource blocks (PRB) are constructed from tones at frequencies specified by the proposed method, or by the method presented in FIG. 10 and FIG. 12 of this invention. The same can be applied to the design of sequences for IEEE 802.20 proposed standard for next generation mobile wideband wireless communications.

Per-user Capacity/Complexity of Sub-Sampling Receivers

Per-user capacity is driven by noise and interference folding, which is in turn determined by the number of antennas N, number of channels in a system Nch, and sampling rate (expressed in number of samples per RF/IF chain to support receiving the signal from each antenna). This capacity needs to be compared with the capacity in the absence of folding due to sub-sampling. Per-user capacity needs to be evaluated together with power consumption reduction and RF/IF-chain count reduction. Sub-sampling causes noise and interference from upper bands to be folded into the desired signal band, which decreases the signal to noise ratio of the receiver. For assessment of the effects of folded noise and interference, each "fold" increases the interference level for factor of 3 dB. The amount of interference depends on the number of channels in the system and the sampling rate. For multiple-antenna contribution to the capacity, we assume that MIMO-like N×N system is deployed, therefore gaining N times in capacity. Overall capacity o is obtained by halving capacity for every 3 dB of interference increase. The table of FIG. 15 shows results of a study of the per-user overall capacity o for sampling rate of one sample per antenna, as a function of the number antennas and number of channels (N: Interference multiplication factor; M: Antenna capacity gain; o: Overall gain; C: Complexity reduction factor; P: Power reduction factor). The table indicates that 2 antenna systems with arbitrary number of channels achieve no capacity gains under any condition since folding overwhelms the desired signal spectrum with folded/aliased noise. Four-antenna system can achieve capacity gain of 4 for two supported channels (suitable for wideband systems—5 MHz or more) with hardware complexity reduction of 4 and power reduction of 2. Eight antenna system can achieve 8-times capacity gain for 4 channels and 4-times capacity gain for 8 channels with 8 or 4 times hardware complexity/power reduction. Bold letters indicate the space of beneficial solutions providing various amounts of gain in per-user capacity with complexity and power savings.

System Capacity

Sub-sampling results in aliasing, and to eliminate aliasing in multi-user multi-channel system, orthogonal signal design is required even in the presence of spectral translation and inversion. In effect, this means that at a particular moment of time not all frequencies are available for use in a single cell of the cellular system for different users. This suggests that system capacity is immediately reduced by the frequency occupancy factor that is required to maintain orthogonality in the presence of spectral inversion and translation—which is further a function of sampling rates, number of antennas and number of channels. This capacity reduction is real, but it is inconsequential when considering real capacities achievable by multi-channel cellular systems in the absence of sub-sampling, which support limited loading factors due to co-channel interference from neighboring cells. The results of the simulation studies of the supportable loading factors for cellular systems with frequency (tone)-hopping are shown in [Zoran Kostic and Nelson Sollenberger, "Dynamic Frequency Hopping in limited bandwidth cellular systems, "IEEE Transactions on Wireless Communications," vol. 20, No. 1, January 2002.], and have been verified in practice. The results show a cumulative distribution function (CDF) of the word error rates as a function of loading factor in a system with 12 resources (frequencies). The best possible loading factor that guarantees satisfactory performance is not higher than 50%. This says that, because of the cellular interference with frequency reuse one, the total number of supportable users is about half as large as the number of available resources (tones/frequencies) for satisfactory frame error rates higher than 0.9. All practical cases in our invention are such that spectral folding requires the reduction in the number of users by the factor of no more than two. This reduction factor is in concert with a loading factor described above. Therefore, sub-sampling does not reduce system capacity.

System Behavior in Dynamically Changing Wireless Channels

Wireless channels are rapidly varying and exhibit numerous multipath components. The choice of OFDM modulation is suitable for both of these aspects since properly sized symbol periods guarantee resistance to multipath, whereas numerous tones provide enough many resources which can be dynamically assigned as channel dictates, as well as protected by means or channel coding. Presence of multiple antennas provides for use of space-time and MIMO coding approaches. Flowchart of FIG. 10 indicates that a base station is monitoring the variability of channel conditions for all terminals, as well as the variability of source data rates, and that it reacts to the same by dynamically adjusting transmit signals.

Resource Control—Matching OFDM Tone Assignments to User Loading

Realistic OFDM signals contain hundreds of tones (narrowband frequencies) and the number of frequency hop patterns thereby increases significantly—for QC sequences one can always design p−1 sequences where p is the prime number equal to the length of sequences [Zoran Kostic and Nelson Sollenberger, "Dynamic Frequency Hopping in limited bandwidth cellular systems, "IEEE Transactions on Wireless Communications," vol. 20, No. 1, January 2002. ]. It is of interest to properly allocate tones to a multiplicity of users and adapt it with the system loading. This task is accomplished by a base station controller 450 of FIG. 4, or alternatively by a Network controller 490 in FIG. 4.

Yet another means of implementing the management is by using distributed control, where controllers in individual terminals (such as 410 in FIG. 4) individually control the choice of signals/waveform/patterns that would be used to transmit data to their receivers. (OFDM tone assignment in OFDM systems). This way of operation is the most suitable for peer-to-peer wireless networks implementations.

Tone, Channel and Time Resource Management for OFDM-Embedded Frequency Hopping Systems The example above uses only the orthogonality and spectral inversion requirements to assign frequencies to individual users. However, the allocation of frequencies should also take into account the measured/estimated fading properties of a channel corresponding to each individual user (multiuser diversity [D. Tse et al., "Multiaccess fading channels—Part 1: Polymatroid structure, optimal resource allocation and throughput capacities," IEEE Transactions Inform. Theory, vol. 44, pp 2769-2815, November 1998.]). In the proposed method, this is accomplished by steps 1010 and 1015 of the flow-chart of FIG. 10.

Trading the Number of Simultaneous Users for Maximized Single User Capacity (Bandwidth Collapsing for Single-User Communication)

The main thrust of the invention is concerned with supporting multiple antennas in wireless receivers with a reduced number of RF/IF chains (or single chain), and providing the same capacity performance as a receiver with the number of chains which matches the number of antennas. This is obviously a desirable feature from the perspective of a single user. As presented previously, the system is built such that interference created due to the sub-sampling-caused aliasing is orthogonal to the desired signal. This orthogonality takes away from the total system capacity, since system resources in form of codes or frequency hop patterns are not any more available for supporting other users. This illustrates the tradeoff between individual user performance and overall system capacity. In the extreme, one could envision a system where the whole system available bandwidth is targeted for transmission to a single user, but the user's receiver is a much narrower bandwidth receiver. By using sub-sampling, the content of all system spectrum components can be aliased into the limited bandwidth of the receiver. Now, the transmit signals which spread the whole signal bandwidth need to be judiciously designed such that the receiver can either distinguish between or combine them for increasing the SNR ratio. This is the maximally greedy resource allocation problem—sending as much data as possible to the simplest possible receiver. This can be envisioned in cases where system loading is low and one wishes to still maximize the rate delivered to a low complexity sub-sampling receiver. This problem can be properly addressed by fundamental method and apparatus of the presented invention, for instance in step 1025 of the flowchart in FIG. 10.

CONCLUSION: ADVANTAGES, RAMIFICATIONS AND SCOPE

The present invention offers a novel solution to the design of reduced complexity receivers, such as in multiple-antenna wireless communications. The invention enables the replacement of multiple analog RF/IF chains, which follow multiple receive antennas, with a smaller number of analog RF/IF chains (or one chain). This is facilitated by ultra-low-rate digital sub-sampling of received signals and transmit signal design.

The invention is novel in that invented sub-sampling receiver design is enabled by corresponding transmitter sequence/pattern/signal design to condition transmitted signals against spectral repetition, translation and inversion caused by sub-sampling aliasing in receivers. The design is based on the novel definition and use of orthogonality of transmitted waveforms. This method was not attempted before. The invention also introduces a method for maintaining the desired properties of transmitted signals in changing channel or source data conditions, by means of dynamic system management.

The invention provides a solution to a well researched problem, and this solution has not occurred to a large number of experts in the field. Previous inventions, if combined together, would have not provided the result obtained by the present invention. Previous inventions viewed multi-channel multi-user nature of communications as an additional problem when dealing with receiver complexity—whereas our invention actively takes advantage of real multi-user multi-channel system features.

The invention enables low cost, low complexity, small, and low power communication devices in realistic multi-user multi-channel wireless communications systems. The invention improves the performance of previously known solutions in several aspects.

The method is applicable to proposed $4^{th}$ generation mobile wireless communications systems being developed in standards 3GPP TR 25.814, and in IEEE 802.20.

The invention applies to other communications systems, beyond wireless, where multiple receivers are a part of a communication system.

Alternative Embodiments

The main embodiment of the present invention uses OFDM modulation. However, the present invention is equally applicable to Time Division Multiple Access (TDMA) systems with single carrier modulation, such as GSM and IS-136 system. In this case, sub-sampling orthogonal sequences are designed in time domain. One embodiment of such sequences is a time-hopping sequence that is derived directly from previously described "Quadratic congruence sub-sampling orthogonal sequence" by folding integer sequence into a one dimensional binary domain. An example of such a sequence can be found in [Maric et al., "A new family of optical code sequences for use in spread-spectrum fiber-optic local area networks," Communications, IEEE Transactions on Volume 41, Issue 8, August 1993 Page(s):1217-1221.].

Another embodiment of the proposed method can also be found in CDMA systems. A systematic search of orthogonal sequences used in CDMA systems (Walsh, OVSF, GOLD and other), and systematic pruning to enable sub-sampling orthogonality, will yield a data base of sequences that can be used in step 1214 of flow-chart in FIG. 12*a* of the present invention.

Another embodiment of the present invention can be realized by a systematic search and sub-sampling pruning of orthogonal sequences used in OFDM of frequency-hopping systems today (Latin squares, cubic sequences) as well as codes used for channel coding, codes used for source coding, and other.

The main embodiment of the invention describes the use of the invention in terms of a base station and a terminal. However, FIG. 1 illustrates components 112 (access point), as well as terminal 113 (functions as a peer-to-peer communicator). In another embodiment of the present invention, any of these devices can take the role of the base station of the preferred embodiment and therefore practice controller methods illustrated in flow-charts is FIGS. 10, 12*a*, and 12*b*.

Another embodiment of the invention is in cognitive radio systems, where methods components 450, 460, 462, 464 would be resident in the cognitive radio. The method described in flowcharts of FIGS. 10, 11, and 12 are in essence sophisticated methods suitable of deployment in a future cognitive radio.

The present invention can be implemented in hardware or in software. The invention applies to packet switched or circuit switched systems, and both to data and voice communications.

The invention is also applicable to systems other than wireless systems.

While this invention has been described in conjunction with specific embodiments thereof, it is evident that many alternatives, modifications, and variations will be apparent to those skilled in the art.

What is claimed is:

1. A method for processing data for transmission in a wireless multiple-antenna communication system with a plurality of terminal receivers, comprising:
   a) generating one or more sequences which are self-orthogonal and mutually-orthogonal in their original form, in their spectrally-translated form, and in their spectrally-inverted form; and
   b) assigning each of said sequences to represent data to be transmitted to one of said plurality of terminal receivers; whereby each sequence from the set of said sequences serves as an identifiable, self not-interfering and mutually not-interfering signature for data to be transmitted to one of said terminal receivers.

2. The method of claim 1, further comprising of:
a) mapping said assigned sequences to code, tone or frequency patterns to be used for modulation of said data to be transmitted to said terminal receivers; and
b) modulating said data to be transmitted to said terminal receivers using said code, tone or frequency patterns;
whereby said modulated data for said terminal receivers can be uniquely identified to be destined to a particular terminal receiver, and whereby said code, tone or frequency patterns preserve properties of self-orthogonality and mutual orthogonality in their original form, spectrally-translated form, and spectrally inverted form.

3. The method of claim 1, wherein generating said sequences is done using Sub-Sampling Quadratic Congruence sequences;
whereby said Sub-Sampling Quadratic Congruence Sequences are self-orthogonal and mutually-orthogonal in their original form, in their spectrally-translated form, and in their spectrally-inverted form.

4. The method of claim 2, wherein modulating said data is done using OFDM modulation; whereby OFDM modulation preserves the properties of self-orthogonality and mutual-orthogonality of said sequences, codes, tones or patterns in their original form, spectrally-translated form, and spectrally inverted form.

5. The method of claim 2, further comprising:
a) collecting information from a plurality of terminal receivers, regarding supported sampling rates, antenna numbers, analog receive chains; and
b) collecting channel information; and
c) calculating optimal assignment of said sequences, codes, tones and patterns used for modulating signals for individual terminal receivers; and
d) sending control information to terminal receivers, over a control channel, about assigned sequences, codes, tones and patterns used for modulating signals; and
e) transmitting data to terminal receivers; and
f) iteratively repeating steps a) to e) such that self-orthogonality and mutual-orthogonality for signals in their original form, signals in their spectrally translated form, and signals in their spectrally inverted form, are continuously preserved;
whereby efficient communication is supported such that terminal receivers can use reduced number of analog receive chains.

6. The method of claim 1, wherein generating said sequences is done using an Ad-Hoc method of iterative generation which comprises the following steps:
a) generating first sequence to be self-orthogonal with respect to itself in its original form, in its spectrally-translated form, and in its spectrally-inverted form; and
b) generating second sequence to be self-orthogonal and mutually-orthogonal with respect to the first sequence in its original form, in its spectrally-translated form, and in its spectrally-inverted form; and
c) generating every following sequence to be self-orthogonal and mutually-orthogonal with respect to the every previous sequence in its original form, in its spectrally-translated form, and in its spectrally-inverted form; and
d) stopping when no additional sequence can be generated such as to be self-orthogonal and mutually-orthogonal with respect to the every previous sequence in its original form, in its spectrally-translated form, and in its spectrally-inverted form;
whereby the resulting sequence set of the generating steps has the properties of self-orthogonality and mutual orthogonality for sequences in their original form, in their spectrally-translated form, and in their spectrally-inverted form.

7. A method for processing received signals in a wireless communications receiver with multiple antennas, within a multi-user multi-channel communication system, comprising:
a) receiving a first plurality of analog modulating signals, which are self-orthogonal and mutually-orthogonal in original, spectrally translated and spectrally inverted form, at each of a second plurality of antennas, thereby forming a second plurality of received analog signals;
b) sampling said second plurality of analog received signals with a sampling switch, thereby creating a third plurality of received signals without signal aliasing;
c) propagating said third plurality of received signals thru a third plurality of analog receiver RF/IF chains;
d) converting from analog to digital said third plurality of received signals, to create a third plurality of digitally sampled received signals; and
e) demultiplexing said third plurality of digitally sampled received signals into a second plurality of digitally sampled received signals;
whereby said second plurality of digitally sampled received signals is a valid representation of every signal of said second plurality of received analog signals and which is without signal aliasing between signal destined to different terminal receivers.

8. The method of claim 7, wherein said sampling is done such that said third plurality is equal in number to 1; thereby said third plurality of received signals is equal to one received signal; said third plurality of analog receiver RF/IF chains is equal to one analog receiver RF/IF chain; and said third plurality of digitally sampled received signal is equal to one digitally sampled received signal;
whereby it is guaranteed that there is no signal aliasing at any stage of the receiver due to used transmitting signals which preserve self-orthogonality and mutual orthogonality, without need for imposing orthogonal multiplexing anywhere in the receiver chain.

9. The method of claim 7, wherein sampling of said second plurality of analog received signals with said sampling switch is performed at sub-sampling rate below double the bandwidth of said multi-channel communications system; whereby it is guaranteed that there is no signal aliasing at any stage of the receiver.

10. The method of claim 7, further comprising:
a) receiving from a transmitter information about an assigned sequence from the set of said self-orthogonal and mutually orthogonal sequences that modulated the transmitted data for said receiver; and
b) generating in the receiver said assigned sequence, where said assigned sequence is self-orthogonal and mutually orthogonal to its family of sequences in its original form, and self-orthogonal and mutually orthogonal in spectrally-translated form, and self-orthogonal and mutually orthogonal in spectrally-inverted form; and
c) mapping said assigned sequence to a code, tone or frequency pattern to be used for demodulation of data transmitted to said wireless receiver, from said second plurality of digitally sampled received signals; and
d) demodulating transmitted data from said second plurality of digitally sampled received using said code, tone or frequency pattern;
whereby said assigned sequences enable an extraction without interference and without aliasing of data transmitted to said wireless receiver, from said second plurality of digitally sampled received signals which were exposed to spectral inversion and spectral translation caused by sub-sampling.

11. The method of claim 10, wherein generating said assigned sequence means generating a sequence that belongs to the family of Sub-Sampling Quadratic Congruence sequences.

12. A wireless communications system using multiple antenna communications comprising a network, base stations with memory, and terminals with multiple antennas, wherein the improvement comprises:
   a) a database in a base station containing information about sequences that are self-orthogonal and mutually orthogonal in their original form, and self-orthogonal and mutually orthogonal in spectrally-translated form, and self-orthogonal and mutually orthogonal in spectrally-inverted form; and
   b) an information collection device in the base station connected to said memory, the information collecting device collecting information about terminal capabilities concerning hardware capabilities such as number of antennas, number of analog receive chains and power consumption targets, and also collecting channel quality information and data source rate requirements, and also collecting information about said sequences utilized in the system; and
   c) a generator of sequences in the base station, the generator capable of generating sequences that are self-orthogonal and mutually orthogonal in their original form, and self-orthogonal and mutually orthogonal in spectrally-translated form, and self-orthogonal and mutually orthogonal in spectrally-inverted form; and
   d) a resource management device in the base station, connected to a database, the resource management device managing the assignment of said sequences in the transmitter of said base station for use to transmit signals to different terminals; and
   e) a first plurality of terminals, where each terminal comprises a second plurality of antennas, a sub-sampling switch, and a third plurality of analog receiver chains; and
   f) a resource management device, in every terminal receiver, the resource management device capable of generating sequences that are self-orthogonal and mutually orthogonal in their original form, and self-orthogonal and mutually orthogonal in spectrally-translated form, and self-orthogonal and mutually orthogonal in spectrally-inverted form;
   whereby said information collection device, said generator, and said management devices are used in collaboration to manage transmission of data from said base stations to said terminal receivers by modulating data using sequences generated by said generator, and said base station and said terminal use the same sequence for modulating data for communication, such that properties of self orthogonal and mutually orthogonal sequences are taken advantage of, and such that neither interference nor aliasing are created when sub-sampling receivers are used with number of analog receiver chains smaller than the number of receive antennas.

13. The system of claim 12, wherein the generator in said base station can generate sub-sampling quadratic congruence sequences, and whereby the generator in said terminal can generate sub-sampling quadratic congruence sequences such that properties of self orthogonal and mutually orthogonal sequences are taken advantage of, and such that neither interference nor aliasing are created when sub-sampling receivers are used with number of analog receiver chains smaller than the number of receive antennas.

14. The system of claim 12, further comprising:
   a) OFDM modulation device for modulating data using said sequences generated in said generator;
   whereby said OFDM modulation does not generate interference or signal aliasing when the OFDM signal is propagated through the channel and processed by the said terminal receivers, with number of analog chains which is smaller than the number of receive antennas.

15. The system of claim 12, wherein said information collection device, generator of sequences, and resource management device in said base station, are subservient to a network controller with its own resource assign manager, information collector and generator of sequences; whereby said network controller manages said system such that interference or signal aliasing are not created in said terminal receivers, with number of analog chains which is smaller than the number of receive antennas.

* * * * *